(12) United States Patent
Zhu et al.

(10) Patent No.: US 11,792,695 B2
(45) Date of Patent: *Oct. 17, 2023

(54) COMMUNICATION METHOD AND COMMUNICATIONS APPARATUS

(71) Applicant: HUAWEI TECHNOLOGIES CO., LTD., Guangdong (CN)

(72) Inventors: Fenqin Zhu, Shanghai (CN); Hao Jing, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,192

(22) Filed: Jun. 28, 2022

(65) Prior Publication Data
US 2022/0408320 A1    Dec. 22, 2022

Related U.S. Application Data

(63) Continuation of application No. 16/929,247, filed on Jul. 15, 2020, now Pat. No. 11,395,192, which is a (Continued)

(30) Foreign Application Priority Data

Jan. 15, 2018 (CN) .......................... 201810037209.3

(51) Int. Cl.
*H04W 36/00* (2009.01)

(52) U.S. Cl.
CPC ... *H04W 36/0022* (2013.01); *H04W 36/0016* (2013.01)

(58) Field of Classification Search
CPC .................... H04W 36/0022; H04W 36/0016
See application file for complete search history.

(56) References Cited

U.S. PATENT DOCUMENTS 10,448,239 B2   10/2019  Faccin et al.
2017/0339609 A1  11/2017  Youn et al.
(Continued)

FOREIGN PATENT DOCUMENTS

WO   2017199957   11/2017
WO   2018006017    1/2018
(Continued)

OTHER PUBLICATIONS

3GPP TS 23.501 V1.5.0 (Nov. 2017), "3rd Generation Partnership Project; Technical Specification Group Services and System Aspects; System Architecture for the 5G System; Stage 2 (Release 15)," Nov. 2011, 170 pages.
(Continued)

*Primary Examiner* — Shukri Taha
(74) *Attorney, Agent, or Firm* — Fish & Richardson P.C.

(57) ABSTRACT

This application provides a communication method and a communications apparatus, to help control switching of a PDU session, thereby improving system performance. The method includes: determining, by a network device based on switching indication information of protocol data unit PDU sessions established by a terminal in a first network, a target PDU session from the established PDU sessions, where all the established PDU sessions have a same data network name DNN; and sending, by the network device, session information of the target PDU session to a mobility management entity device in a second network.

20 Claims, 20 Drawing Sheets

Related U.S. Application Data continuation of application No. PCT/CN2019/071718, filed on Jan. 15, 2019.

(56) References Cited

U.S. PATENT DOCUMENTS

| | | | |
|---|---|---|---|
| 2018/0270778 A1* | 9/2018 | Bharatia | ................ H04L 65/80 |
| 2018/0376445 A1 | 12/2018 | Yoon et al. | |
| 2019/0281508 A1 | 9/2019 | Kawasaki et al. | |

FOREIGN PATENT DOCUMENTS

| | | |
|---|---|---|
| WO | 2018008980 | 1/2018 |
| WO | 2018144308 | 8/2018 |

OTHER PUBLICATIONS

3GPP TS 23.501 V15.0.0 (Dec. 2017), "3rd Generation Partnership Project; Technical Specification Group Services and System Aspects; System Architecture for the 5G System; Stage 2 (Release 15)," Dec. 2017, 181 pages.

3GPP TS 23.502 V15.0.0 (Dec. 2017), "3rd Generation Partnership Project; Technical Specification Group Services and System Aspects; Procedures for the 5G System; Stage 2 (Release 15)," Dec. 2017, 257 pages.

EPO Communication pursuant to Rule 164(1) EPC issued in European Application No. 19738645.1 dated Dec. 2, 2020, 20 pages.

Ericsson, "Handling of Ethernet and Unstructured POU Session Types when Interworking with EPC (23.502)," 3GPP SA WG2 Meeting #123, S2-177939, Ljubljana, Slovenia, Oct. 23-27, 2017, 9 pages.

Extended European Search Report issued in European Application No. 19738645.1 dated Feb. 25, 2021, 26 pages.

Huawei et al.,"TS23.502: Clarification about QoS Flow Management in PDU Session Related Procedures," SA WG2 Meeting #124, S2-179373, Reno, Nevada, USA, Nov. 27-Dec. 1, 2017, 34 pages.

NTT Docomo et al., "OI#20: No-N26 Interworking Procedures," SA WG2 Meeting #122bis, S2-178126, Sofia-Antipolis, France, Aug. 21-25, 2017, 17 pages.

Office Action issued in Chinese Application No. 201810037209.3 dated Feb. 7, 2020, 11 pages.

Office Action issued in Indian Application No. 202047031590 dated Sep. 10, 2021, 7 pages.

PCT International Search Report and Written Opinion issued in International Application No. PCT/CN2019/071718 dated Apr. 17, 2019, 15 pages (with English translation).

Qualcomm Incorporated, "23.501—Minimizing the need for PDU Session Re-Establishment due to UE Mobility and UPF Relocation," SA WG2 Meeting #124, S2-120 S2-173112, P.R. China, May 15-19, 2017, 6 pages.

* cited by examiner

200

```
A network device determines, based on switching indication
information of protocol data unit PDU sessions established by a
terminal in a first network, a target PDU session from the          S210
established PDU sessions, where all the established PDU
sessions have a same data network name DNN
```

```
The network device sends session information of the target
PDU session to a mobility management entity device in a             S220
second network
```

```
A terminal obtains switching indication information of protocol
data unit PDU sessions established in a first network, where all    S310
the established PDU sessions have a same data network name
DNN
```

```
The terminal determines a target PDU session from the
established PDU sessions based on the switching indication          S320
information
```

```
The terminal sends an identifier of the target PDU session to a
first control plane function network element by using a mobility    S330
management entity device in a second network
```

FIG. 3

COMMUNICATION METHOD AND COMMUNICATIONS APPARATUS

CROSS-REFERENCE TO RELATED APPLICATIONS

This application is a continuation of U.S. patent application Ser. No. 16/929,247, filed on Jul. 15, 2020, which is a continuation of International Application No. PCT/CN2019/071718, filed on Jan. 15, 2019, which claims priority to Chinese Patent Application No. 201810037209.3, filed on Jan. 15, 2018. All of the afore-mentioned patent applications are hereby incorporated by reference in their entireties.

TECHNICAL FIELD

This application relates to the communications field, and more specifically, to a communication method and a communications apparatus in the communications field.

BACKGROUND

With rapid development of wireless communications technologies, a fifth generation (5G) mobile communications technology emerges. In an initial network deployment phase, because of insufficient coverage of a 5G network, when a location of user equipment (UE) changes, the UE needs to switch a session between the 5G network and a fourth generation (4G) network.

An access point name (APN) parameter is required when a packet data network (PDN) connection is being established in the 4G network, and a data network name (DNN) is required when a protocol data unit (PDU) session is being created in 5G. The APN in 4G is equivalent to the DNN in 5G.

The UE may establish one or more PDU sessions in 5G, and the PDU sessions may use a same DNN. In addition, it is not specified in 5G that a single session management device needs to be selected for sessions with a same DNN. Therefore, the one or more PDU sessions with a same DNN may be anchored to different session management devices. In 4G, to control an aggregated maximum bit rate (AMBR) of the APN, it is required that one or more PDN connections with a same APN can be anchored to only one session management device. When one or more PDU sessions with a same DNN are switched, an uncontrolled situation is caused. Consequently, system performance is relatively poor.

SUMMARY

This application provides a communication method and a communications apparatus, to help improve system performance.

According to a first aspect, a communication method is provided, including: determining, by a network device based on switching indication information of protocol data unit PDU sessions established by a terminal in a first network, a target PDU session from the established PDU sessions, where all the established PDU sessions have a same data network name DNN; and sending, by the network device, session information of the target PDU session to a mobility management entity device in a second network.

Therefore, in this embodiment of this application, the network device may determine the target PDU session from the established PDU sessions based on the switching indication information of the established PDU sessions. In this way, the target PDU session may be used as a PDU session that can be switched to the second network, so as to avoid an uncontrolled situation caused when all the PDU sessions established by the terminal in the first network need to be switched to a same control plane function network element in the second network. This helps control switching of a PDU session, thereby improving system performance.

Optionally, the terminal may establish one or more PDU sessions in the first network. Optionally, if the terminal establishes one PDU session in the first network, there is one piece of switching indication information of the PDU sessions established by the terminal in the first network. If the terminal establishes multiple PDU sessions in the first network, the switching indication information of the PDU sessions established by the terminal in the first network may be switching indication information of the multiple PDU sessions.

Optionally, the first network is a 5G network, and the second network is a 4G network.

Optionally, the network device is a user data management network element or an access and mobility management function entity.

In some implementations, the switching indication information is used to indicate a switching priority of each of the established PDU sessions; and the determining a target PDU session from the established PDU sessions includes: determining, by the network device as the target PDU session, a PDU session with a highest switching priority in the established PDU sessions. For example, a switching priority of a PDU session may be represented by a number. Optionally, there may be one or more PDU sessions with a highest switching priority.

In some implementations, the switching indication information is used to indicate whether each of the established PDU sessions can be switched; and the determining a target PDU session from the established PDU sessions includes: determining, by the network device when the switching indication information indicates that there is only one PDU session that can be switched, the PDU session that can be switched as the target PDU session; or determining, by the network device when the switching indication information indicates that there are at least two PDU sessions that can be switched, the target PDU session from the at least two PDU sessions.

In some implementations, the determining, by the network device when the switching indication information indicates that there are at least two PDU sessions that can be switched, the target PDU session from the at least two PDU sessions includes: if the at least two PDU sessions belong to a same control plane function network element, determining, by the network device, each of the at least two sessions as the target PDU session; or if the at least two PDU sessions belong to different control plane function network elements, determining, by the network device, the target PDU session from the at least two PDU sessions based on assistance information of each of the at least two PDU sessions.

In this embodiment of this application, the switching indication information may indicate that a PDU session can be switched. If the network device learns that the switching indication information may indicate at least two PDU sessions, the network device determines whether the at least two PDU sessions belong to a same control plane function network element. If the at least two PDU sessions belong to a same control plane function network element, the network device may switch the at least two PDU sessions, that is, the at least two PDU sessions are target PDU sessions. If the at least two PDU sessions do not belong to a same control plane function network element, the network device may determine the target PDU session based on assistance information of the at least two PDU sessions; or the network device may determine priorities of the at least two PDU sessions based on assistance information of the at least two PDU sessions, and determine a PDU session with a highest switching priority as the target PDU session.

In some implementations, before the determining, by a network device based on switching indication information of protocol data unit PDU sessions established by a terminal in a first network, a target PDU session from the established PDU sessions, the method further includes: receiving, by the network device, assistance information that is of a first PDU session in the established PDU sessions and that is sent by a first control plane function network element; and determining, by the network device, switching indication information of the first PDU session based on the assistance information. Herein, the network device may be a user data management network element or an access and mobility management function device.

Optionally, when the network device is a user data management network element, the method further includes: sending, by the user data management network element, the switching indication information of the first PDU session to the first control plane function network element.

In other words, the user data management network element may receive the assistance information that is of the first PDU session and that is sent by the first control plane function network element, determine the switching indication information of the first PDU session based on the assistance information of the first PDU session, and send the determined switching indication information of the first PDU session to the first control plane function network element.

In some implementations, the assistance information includes at least one of the following: an internet protocol IP (IP) address version corresponding to the PDU session, single network slice selection assistance information corresponding to the PDU session, a session and service continuity SSC mode corresponding to the PDU session, an allocation and retention priority ARP corresponding to the PDU session, a service type corresponding to the PDU session, and an establishment time corresponding to the PDU session.

In some implementations, before the determining, by a network device based on switching indication information of protocol data unit PDU sessions established by a terminal in a first network, a target PDU session from the established PDU sessions, the method includes: receiving, by the network device, the switching indication information that is of the PDU sessions established by the terminal in the first network and that is sent by at least one control plane function network element.

In some implementations, the network device is a user data management network element, and before the determining, by a network device based on switching indication information of protocol data unit PDU sessions established by a terminal in a first network, a target PDU session from the established PDU sessions, the method includes: receiving, by the user data management network element, initial switching indication information that is of a second PDU session in the PDU sessions established by the terminal in the first network and that is sent by a second control plane function network element; and adjusting, by the user data management network element, the initial switching indication information to obtain switching indication information of the second PDU session; and the method further includes: sending, by the user data management network element, the switching indication information of the second PDU session to the second control plane function network element.

In other words, the user data management network element may adjust the initial switching indication information that is of the second PDU session and that is sent by the second control plane function network element, and may send the adjusted switching indication information of the second PDU session to the second control plane function network element. A specific adjustment manner is performing adjustment according to a local policy. This is not limited in this embodiment of this application.

In some implementations, the session information of the target PDU session includes an identifier of a control plane function network element corresponding to the target PDU session and a DNN of the target PDU session.

According to a second aspect, a communication method is provided, including: obtaining, by a terminal, switching indication information of protocol data unit PDU sessions established in a first network, where all the established PDU sessions have a same data network name DNN; determining, by the terminal, a target PDU session from the established PDU sessions based on the switching indication information of the established PDU sessions; and sending, by the terminal, an identifier of the target PDU session to a first control plane function network element by using a mobility management entity device in a second network.

Therefore, in this embodiment of this application, the terminal may determine the target PDU session from the established PDU sessions based on the switching indication information of the established PDU sessions. In this way, the target PDU session may be used as a PDU session that can be switched to the second network, so as to avoid an uncontrolled situation caused when all the PDU sessions established by the terminal in the first network need to be switched to a same control plane function network element in the second network. This helps control switching of a PDU session, thereby improving system performance.

In some implementations, the switching indication information is used to indicate a switching priority of each of the established PDU sessions; and the determining a target PDU session from the established PDU sessions includes: determining, by the terminal as the target PDU session, a PDU session with a highest switching priority in the established PDU sessions.

In some implementations, the switching indication information is used to indicate whether each of the established PDU sessions can be switched; and the determining a target PDU session from the established PDU sessions includes: determining, by the terminal as the target PDU session, a PDU session that can be switched in the established PDU sessions.

In some implementations, the sending, by the terminal, an identifier of the target PDU session to a first control plane function network element by using a mobility management entity device in a second network includes: sending, by the terminal, the identifier of the target PDU session and a DNN of the target PDU session to the mobility management entity device, where the DNN of the target PDU session is used by the mobility management entity device to determine the first control plane function network element, so that the mobility management entity device sends the identifier of the target PDU session to the first control plane function network element.

In some implementations, the sending, by the terminal, the identifier of the target PDU session and a data network name of the target PDU session to the mobility management entity device includes: sending, by the terminal, a first request message to the mobility management entity device, where the first request message carries the identifier of the target PDU session and the DNN of the target PDU session, and the first request message is an attach request message or a session establishment request message.

In some implementations, the obtaining, by a terminal, switching indication information of PDU sessions established in a first network includes: receiving, by the terminal, the switching indication information of the established PDU sessions that is sent by at least one control plane function network element.

In this embodiment of this application, the terminal may receive the switching indication information of the established PDU sessions that is sent by the at least one control plane function network element. The switching indication information of the established PDU sessions that is sent by the at least one control plane function network element may be determined by the at least one control plane function network element, or may be received by the at least one control plane function network element from a user data management network element. This is not limited in this embodiment of this application.

In some implementations, the obtaining, by a terminal, switching indication information of PDU sessions established in a first network includes: sending, by the terminal, initial switching indication information of the first PDU session to a second control plane function network element, where the initial switching indication information is used to determine switching indication information of the first PDU session; and receiving, by the terminal, the switching indication information that is of the first PDU session and that is sent by the second control plane function network element.

In other words, the terminal may send the initial switching indication information of the first PDU session to the second control plane function network element. The second control plane function network element may adjust the initial switching indication information of the first PDU session to obtain the switching indication information of the first PDU session, or the second control plane function network element may send the initial switching indication information of the first PDU session to a user data management network element. The user data management network element adjusts the initial switching indication information of the first PDU session, and sends the adjusted switching indication information of the first PDU session to the second control plane function network element. The second control plane function network element sends the switching indication information of the first PDU session to the terminal.

According to a third aspect, a communication method is provided, including: receiving, by a first control plane function network element, a session establishment request message sent by a terminal, where the session establishment request message is used to request to establish a first protocol data unit PDU session; and obtaining, by the first control plane function network element, switching indication information of the first PDU session. The first control plane function network element may be any one of multiple control plane function network elements. Session establishment request messages received by the plurality of control plane function network elements may request to establish multiple PDU sessions, and the multiple PDU sessions have a same DNN.

In some implementations, the switching indication information is used to indicate a priority of the first PDU session or used to indicate whether the first PDU session can be switched.

In some implementations, the session establishment request message includes the switching indication information of the first PDU session; the obtaining, by the first control plane function network element, switching indication information of the first PDU session includes: obtaining, by the first control plane function network element, the switching indication information of the first PDU session from the session establishment request message; and the method further includes: sending, by the first control plane function network element, the switching indication information of the first PDU session to a user data management network element or an access and mobility management function device.

In this embodiment of this application, if the session establishment request message sent by the terminal to the first control plane function network element carries the switching indication information of the first PDU session, the first control plane function network element may obtain the switching indication information of the first PDU session from the session establishment request message.

In some implementations, the obtaining, by the first control plane function network element, switching indication information of the first PDU session includes: obtaining, by the first control plane function network element, initial switching indication information of the first PDU session; and obtaining, by the first control plane function network element, the switching indication information that is of the first PDU session and that is obtained through adjustment based on the initial switching indication information; and the method further includes: sending, by the first control plane function network element, the switching indication information of the first PDU session to the terminal, a user data management network element, or an access and mobility management function device.

In this embodiment of this application, the initial switching indication information of the first PDU session may be adjusted to the switching indication information of the first PDU session. Specifically, the following several manners may be included. In a first manner, the first control plane function network element receives the initial switching indication information that is of the first PDU session and that is sent by the terminal, and the session establishment request message may carry the initial switching indication information. The first control plane function network element may adjust the initial switching indication information of the first PDU session. The first control plane function network element may send the adjusted switching indication information of the first PDU session to the terminal, for example, send the adjusted switching indication information of the first PDU session to the terminal by using a PCO. In this way, the terminal may receive switching indication information of multiple PDU sessions that is sent by multiple control plane function network elements; and the terminal may determine a target PDU session, namely, a PDU session that needs to be switched, based on the switching indication information of the multiple PDU sessions. Alternatively, the first control plane function network element may send the adjusted switching indication information of the first PDU session to the user data management network element. In this way, the user data management network element may receive switching indication information of multiple PDU sessions that is sent by multiple control plane function network elements, and the user data management network element may determine a target PDU session, namely, a PDU session that needs to be switched, based on the switching indication information of the multiple PDU sessions. Alternatively, the first control plane function network element may send the adjusted switching indication information of the first PDU session to the access and mobility management function device. In this way, the access and mobility management function device may receive switching indication information of multiple PDU sessions that is sent by multiple control plane function network elements; and the access and mobility management function device may determine a target PDU session, namely, a PDU session that needs to be switched, based on the switching indication information of the multiple PDU sessions. In a second manner, the first control plane function network element may receive the initial switching indication information that is of the first PDU session and that is sent by the terminal, or may determine the initial switching indication information of the first PDU session, and then send the initial switching indication information of the first PDU session to the user data management network element. The user data management network element may adjust the initial switching indication information of the first PDU session to obtain the switching indication information of the first PDU session. The user management function network element sends the adjusted switching indication information of the first PDU session to the first control plane function network element, and the first control plane function network element may send the adjusted switching indication information of the first PDU session to the access and mobility management function device. In this way, the access and mobility management function device may receive switching indication information of multiple PDU sessions that is sent by multiple control plane function network elements; and the access and mobility management function device may determine a target PDU session, namely, a PDU session that needs to be switched, based on the switching indication information of the multiple PDU sessions. Alternatively, the first control plane function network element may send the adjusted switching indication information of the first PDU session to the terminal. In this way, the terminal may receive switching indication information of multiple PDU sessions that is sent by multiple control plane function network elements; and the terminal may determine a target PDU session, namely, a PDU session that needs to be switched, based on the switching indication information of the multiple PDU sessions.

In some implementations, the obtaining, by the first control plane function network element, switching indication information of the first PDU session includes: sending, by the first control plane function network element, assistance information of the first PDU session to a user data management network element; and receiving, by the first control plane function network element, the switching indication information that is of the first PDU session and that is sent by the user data management network element, where the switching indication information of the first PDU session is determined based on the assistance information of the first PDU session, and the assistance information of the first PDU session includes at least one of an internet protocol IP address version corresponding to the first PDU session, single network slice selection assistance information corresponding to the first PDU session, a session and service continuity SSC mode corresponding to the first PDU session, an allocation and retention priority ARP corresponding to the first PDU session, a service type corresponding to the first PDU session, and an establishment time corresponding to the first PDU session; and the method further includes: sending, by the first control plane function network element, the switching indication information of the first PDU session to the terminal or an access and mobility management function device.

In some implementations, the method further includes: receiving, by the first control plane function network element, an identifier of the target PDU session and a DNN of the target PDU session that are sent by a mobility management entity device in a second network; searching, for the target PDU session by the first control plane function network element based on the identifier of the target PDU session and the DNN of the target PDU session, multiple PDU sessions corresponding to the DNN that are stored by the first control plane function network element; and if the target PDU session is found, selecting the target PDU session for switching; or if the target PDU session is not found, rejecting the target PDU session.

In some implementations, the method further includes: receiving, by the first control plane function network element, a PDU session update request that is corresponding to a first data network name (the first data network name is a data network name that is of a current PDU session and that is sent by the terminal to a mobility management entity device in a second network) and that is sent by the mobility management entity device in the second network; and after the first control plane function network element receives the session update request corresponding to the first data network name, obtaining, by the first control plane function network element based on the first data network name, a PDU session corresponding to the first data network name. If the first data network name is corresponding to one PDU, the PDU session is a session that needs to be switched. If the first data network name is corresponding to multiple PDU sessions, the first control plane function network element selects one PDU session as a PDU session that needs to be switched. The first control plane function network element may randomly select one PDU session as a PDU session that needs to be switched, or determine a to-be-switched PDU session based on assistance information of the PDU sessions. The first control plane function network element sends an identifier of the to-be-switched PDU session to the terminal.

In some implementations, the method further includes: sending, by the first control plane function network element, a data network name DNN of the first PDU session and an identifier of the first control plane function network element to the user data management network element. Optionally, the first control plane function network element may send session information of the first PDU session to the user data management network element, where the session information includes the switching indication information of the first PDU session, the DNN of the first PDU session, and the identifier of the first control plane function network element. In other words, the first control plane function network element may simultaneously send the switching indication information of the first PDU session, the DNN of the first PDU session, and the identifier of the first control plane function network element to the user data management network element. In this way, the user data management network element can store the session information of the first PDU session. When receiving session information of multiple PDU sessions (the multiple PDU sessions have a same DNN), the user data management network element determines a target PDU session based on switching indication information of the multiple PDU sessions, and then sends, to the mobility management entity device in the second network, a DNN of the target PDU session and an identifier of a control plane function network element corresponding to the target PDU session.

According to a fourth aspect, a communication method is provided, including: sending, by a terminal, a first data network name corresponding to a current PDU session to a mobility management entity device in a second network; and receiving, by the terminal, an identifier that is of a switched PDU session and that is sent by a control plane function network element, and determining the switched PDU session based on the identifier of the PDU session. Optionally, the terminal receives a PCO sent by the control plane function network element, obtains the identifier of the switched PDU session from the PCO, and determines the switched PDU session based on the identifier of the PDU session. In this way, UE can associate a PDN connection with a corresponding session.

In some implementations, optionally, the sending, by a terminal, a first data network name corresponding to a current PDU session to a mobility management entity device in a second network includes: sending, by the terminal, an attach request message or a session establishment request message to the mobility management entity device in the second network, where the attach request message or the session establishment request message carries the data network name corresponding to the current PDU session.

In some implementations, optionally, if the terminal sends, in the attach request message, the data network name corresponding to the current PDU session to the mobility management entity device in the second network, after determining a PDU session that needs to be switched, the control plane function network element switches the PDU session in an attach procedure. Alternatively, if the terminal adds, to the session establishment request message, the data network name corresponding to the current PDU session, after determining a PDU session that needs to be switched, the control plane function network element switches the PDU session in a session establishment request procedure. After completing switching, the control plane function network element sends the identifier of the switched PDU session to the terminal. For example, the control plane function network element sends a PCO to the terminal, and the PCO carries the identifier of the switched PDU session.

According to a fifth aspect, a communications apparatus is provided and is configured to perform the method according to any one of the first aspect or the possible implementations of the first aspect. Specifically, the apparatus includes units configured to perform the method according to any one of the first aspect or the possible implementations of the first aspect.

According to a sixth aspect, a communications apparatus is provided and is configured to perform the method according to any one of the second aspect or the possible implementations of the second aspect. Specifically, the apparatus includes units configured to perform the method according to any one of the second aspect or the possible implementations of the second aspect.

According to a seventh aspect, a communications apparatus is provided and is configured to perform the method according to any one of the third aspect or the possible implementations of the third aspect. Specifically, the apparatus includes units configured to perform the method according to any one of the third aspect or the possible implementations of the third aspect.

According to an eighth aspect, a communications apparatus is provided and is configured to perform the method according to any one of the fourth aspect or the possible implementations of the fourth aspect. Specifically, the apparatus includes units configured to perform the method according to any one of the fourth aspect or the possible implementations of the fourth aspect.

According to a ninth aspect, a communications apparatus is provided, and the apparatus includes a transceiver (which may include a transmitter and a receiver), a memory, and a processor. The transceiver, the memory, and the processor communicate with each other through an internal connection path. The memory is configured to store an instruction. The processor is configured to execute the instruction stored in the memory, to control the receiver to receive a signal and control the transmitter to send a signal, so that the apparatus performs the method according to any one of the first aspect or the possible implementations of the first aspect.

According to a tenth aspect, a communications apparatus is provided, and the apparatus includes a transceiver (which may include a transmitter and a receiver), a memory, and a processor. The transceiver, the memory, and the processor communicate with each other through an internal connection path. The memory is configured to store an instruction. The processor is configured to execute the instruction stored in the memory, to control the receiver to receive a signal and control the transmitter to send a signal, so that the apparatus performs the method according to any one of the second aspect or the possible implementations of the second aspect.

According to an eleventh aspect, a communications apparatus is provided, and the apparatus includes a transceiver (which may include a transmitter and a receiver), a memory, and a processor. The transceiver, the memory, and the processor communicate with each other through an internal connection path. The memory is configured to store an instruction. The processor is configured to execute the instruction stored in the memory, to control the receiver to receive a signal and control the transmitter to send a signal, so that the apparatus performs the method according to any one of the third aspect or the possible implementations of the third aspect.

According to a twelfth aspect, a communications apparatus is provided, and the apparatus includes a transceiver (which may include a transmitter and a receiver), a memory, and a processor. The transceiver, the memory, and the processor communicate with each other through an internal connection path. The memory is configured to store an instruction. The processor is configured to execute the instruction stored in the memory, to control the receiver to receive a signal and control the transmitter to send a signal, so that the apparatus performs the method according to any one of the fourth aspect or the possible implementations of the fourth aspect.

According to a thirteenth aspect, a service processing system is provided, including the apparatus according to any one of the fifth aspect or the optional implementations of the fifth aspect, the apparatus according to any one of the sixth aspect or the optional implementations of the sixth aspect, and the apparatus according to any one of the seventh aspect or the optional implementations of the seventh aspect. Optionally, the system includes the apparatus according to any one of the fifth aspect or the optional implementations of the fifth aspect, the apparatus according to any one of the sixth aspect or the optional implementations of the sixth aspect, and the apparatus according to any one of the eighth aspect or the optional implementations of the eighth aspect. Optionally, the system includes the apparatus according to any one of the ninth aspect or the optional implementations of the ninth aspect, the apparatus according to any one of the tenth aspect or the optional implementations of the tenth aspect, and the apparatus according to any one of the eleventh aspect or the optional implementations of the eleventh aspect. Optionally, the system includes the apparatus according to any one of the ninth aspect or the optional implementations of the ninth aspect, the apparatus according to any one of the tenth aspect or the optional implementations of the tenth aspect, and the apparatus according to any one of the twelfth aspect or the optional implementations of the twelfth aspect.

According to a fourteenth aspect, a computer readable storage medium is provided. The computer readable storage medium stores an instruction, and when the instruction runs on a computer, the computer performs the method according to any one of the first aspect or the possible implementations of the first aspect.

According to a fifteenth aspect, a computer readable storage medium is provided. The computer readable storage medium stores an instruction, and when the instruction runs on a computer, the computer performs the method according to any one of the second aspect or the possible implementations of the second aspect.

According to a sixteenth aspect, a computer readable storage medium is provided. The computer readable storage medium stores an instruction, and when the instruction runs on a computer, the computer performs the method according to any one of the third aspect or the possible implementations of the third aspect.

According to a seventeenth aspect, a computer readable storage medium is provided. The computer readable storage medium stores an instruction, and when the instruction runs on a computer, the computer performs the method according to any one of the fourth aspect or the possible implementations of the fourth aspect.

According to an eighteenth aspect, this application provides a computer program product including an instruction. When the instruction runs on a computer, the computer performs the method according to any one of the first aspect or the possible implementations of the first aspect.

According to a nineteenth aspect, this application provides a computer program product including an instruction. When the instruction runs on a computer, the computer performs the method according to any one of the second aspect or the possible implementations of the second aspect.

According to a twentieth aspect, this application provides a computer program product including an instruction. When the instruction runs on a computer, the computer performs the method according to any one of the third aspect or the possible implementations of the third aspect.

According to a twenty-first aspect, this application provides a computer program product including an instruction. When the instruction runs on a computer, the computer performs the method according to any one of the fourth aspect or the possible implementations of the fourth aspect.

According to a twenty-second aspect, this application provides a communications chip, and the communications chip stores an instruction. When the instruction runs on a terminal, a network device, or a control plane function network element, the terminal, the network device, or the control plane function network element performs any method in the foregoing aspects.

BRIEF DESCRIPTION OF DRAWINGS

FIG. 2 is a schematic diagram of a communication method according to an embodiment of this application;

FIG. 3 is a schematic diagram of another communication method according to an embodiment of this application;

DESCRIPTION OF EMBODIMENTS

For ease of understanding the technical solutions of the embodiments of this application, the following first briefly describes technologies related to this application.

Figure 1:
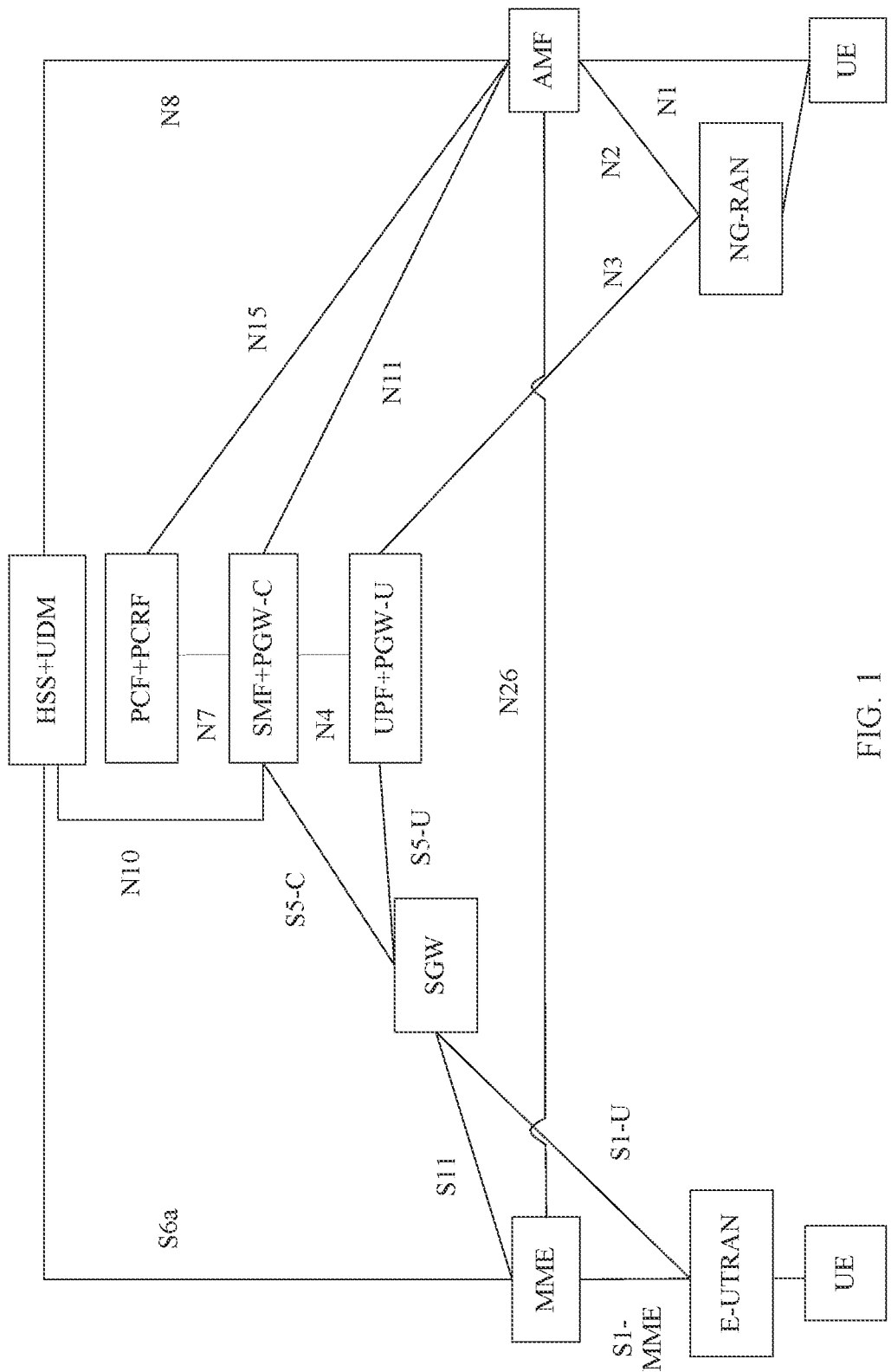
FIG. 1 is a schematic diagram of an architecture system of interworking between a 4G network and a 5G network according to an embodiment of this application.

The embodiments of the present invention provide a mobility management method, and the method may be applied to an architecture system 100 of interworking between a 4G network and a 5G network shown in FIG. 1. As shown in FIG. 1, the architecture system 100 includes the following entities shared by the 4G network and the 5G network: a user plane function (UPF) entity+PDN gateway user plane function (PGW-U) entity, a session management function (SMF) entity+PDN gateway control plane function (PGW-C) entity, a policy control function (PCF) entity+ policy and charging rules function (PCRF) entity, and a home subscriber server (HSS)+unified data management (UDM) entity. Herein, "+" represents integrated configuration. A UPF is a user plane function of the 5G network, and a PGW-U is a gateway user plane function, corresponding to the UPF, of the 4G network. An SMF is a session management function of the 5G network, and a PGW-C is a gateway control plane function, corresponding to the SMF, of the 4G network. A PCF is a policy control function of the 5G network, and a PCRF is a policy and charging rules function, corresponding to the PCF, of the 4G network. Herein, "integrated configuration" means that one device has functions of both of two entities. In the embodiments of this application, for ease of description, the HSS+UDM entity is referred to as a user data management network element, the PGW-C entity+SMF entity is referred to as a control plane function network element, and the UPF entity+PGW-U entity is referred to as a user plane function network element. This is centrally described herein, and is not described again later. Certainly, the network devices obtained through integrated configuration may have other names. This is not specifically limited in the embodiments of this application.

In addition, as shown in FIG. 1, the architecture of interworking between the 4G network and the 5G network may further include a mobility management entity (MME), a serving gateway (SGW), and an access and mobility management function (AMF) entity in the 5G network. A terminal accesses the 4G network by using an evolved universal terrestrial radio access network (E-UTRAN) device, and the terminal accesses the 5G network by using a next generation radio access network (NG-RAN) device. The E-UTRAN device communicates with the MME through an SI-MME interface, the E-UTRAN device communicates with the SGW through an SI-U interface, the MME communicates with the SGW through an S11 interface, the MME communicates with the user data management network element through an S6a interface, the MME communicates with the AMF entity through an N26 interface, the SGW communicates with the PGW-U entity+UPF entity through an S5-U interface, the SGW communicates with the PGW-C entity+SMF entity through an S5-C interface, the PGW-U entity+UPF entity communicates with the NG-RAN device through an N3 interface, the PGW-U entity+UPF entity communicates with the PGW-C entity+SMF entity through an N4 interface, the PGW-C entity+SMF entity communicates with the PCRF entity+PCF entity through an N7 interface, the HSS+UDM entity communicates with the PGW-C entity+SMF entity through an N10 interface, the HSS+UDM entity communicates with the AMF entity through an N8 interface, the PCRF entity+PCF entity communicates with the AMF entity through an N15 interface, the PGW-C entity+SMF entity communicates with the AMF entity through an N11 interface, the AMF entity communicates with the NG-RAN device through an N2 interface, and the AMF entity communicates with the terminal through an N1 interface. In the foregoing interworking architecture, the N26 interface may not exist between the MME and the AMF in some scenarios, and the N26 interface may be used in context transfer and switching processes of the terminal. This application separately describes related possible implementations for whether the N26 interface exists between the MME and the AMF.

It should be noted that in FIG. 1, that the terminal is UE and is merely used as an example, and names of interfaces between network elements in FIG. 1 are merely examples. In specific implementation, the interfaces may have other names. This is not specifically limited in the embodiments of this application.

It should be noted that the NG-RAN device in the 5G network may also be referred to as an access device. The access device is a device accessing a core network. For example, the access device may be a base station, a broadband network gateway (BNG), an aggregation switch, or a non-3GPP access device. The base station may include various forms of base stations, for example, a macro base station, a micro base station (also referred to as a small cell), a relay node, and an access point. This is not specifically limited in the embodiments of this application.

Certainly, the 4G network and the 5G network may further include other network elements. For example, the 4G network may further include a general packet radio system (GPRS) serving support node (SGSN), and the 5G network may further include an authentication server function (AUSF) entity and a network slice selection function (NSSF) entity. This is not specifically limited in the embodiments of this application.

The terminal in the embodiments of this application may include various types of handheld devices, in-vehicle devices, wearable devices, and computing devices that have a wireless communication function, or another processing device connected to a wireless modem; or may include a subscriber unit, a cellular phone, a smart phone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station, a terminal device, and the like. For ease of description, the devices mentioned above are collectively referred to as the terminal in this application.

APN:

In the 4G network, the terminal may provide an APN for the MME when initiating a packet service. The MME parses a domain name by using a domain name server (DNS) and based on the APN provided by the terminal, so as to obtain an address (for example, an internet protocol address) of a session management network element, so that the terminal accesses a PDN corresponding to the APN.

DNN:

In the 5G network, the terminal may provide S-NSSAI and a DNN for the AMF when initiating PDU session establishment. The AMF determines an address of a session management network element based on the S-NSSAI, the DNN, and other information (such as subscription information of the terminal and a local operator policy). The determined session management network element establishes a PDU session for the terminal based on the S-NSSAI and the DNN.

The APN in the 4G network is equivalent to the DNN in the 5G network, and a PDN connection in the 4G network is equivalent to a PDU session in the 5G network. The UE may establish one or more PDU sessions in 5G, and the PDU sessions may use a same DNN. The one or more PDU sessions with a same DNN may be anchored to different control plane function network elements. In 4G, to control an aggregate maximum bit rate (AMBR) of the APN, it is required that one or more PDN connections with a same APN can be anchored to only one control plane function network element. If one or more PDU sessions with a same DNN in 5G are switched to one or more PDN connections with a same APN in 4G, how to switch a session is a problem to be resolved urgently. Specific to this problem, in the embodiments of this application, a target PDU session may be determined from at least one PDU session with a same DNN based on switching indication information, and the target PDU session is used as a PDU session that can be switched, so as to avoid an uncontrolled situation caused because how to switch at least one PDU session with a same DNN is unknown, thereby improving system performance. The following details, with reference to the accompanying drawings, communication methods provided in the embodiments of this application.

FIG. 2 shows a communication method 200 according to an embodiment of this application. The method 200 includes the following steps.

S210. A network device determines, based on switching indication information of protocol data unit PDU sessions established by a terminal in a first network, a target PDU session from the established PDU sessions, where all the established PDU sessions have a same data network name DNN. Optionally, the terminal may establish one or more PDU sessions in the first network. Optionally, there may be one or more target PDU sessions. Optionally, the network device may be a user data management network element or an access and mobility management function device.

It should be noted that if the terminal establishes N PDU sessions in the first network, M PDU sessions in the N PDU sessions have a same data network name, where N is greater than or equal to M, and M and N are positive integers.

It should be understood that the switching indication information of the established PDU sessions may include the following: Each PDU session in the established PDU sessions may have corresponding switching indication information, and PDU sessions with same or different switching indication information may exist in the established PDU sessions. Alternatively, at least one PDU session in the established PDU sessions has corresponding switching indication information. For example, the switching indication information may indicate whether the PDU session can be switched. For example, if only one of three PDU sessions can be switched, there is switching indication information corresponding to the PDU session, and the switching indication information indicates that the PDU session can be switched. Whether the remaining two PDU sessions can be switched may not be indicated, and it is considered by default that the remaining two PDU sessions cannot be switched.

In this embodiment of this application, the switching indication information has at least two different indication functions, and two cases are described below.

Case 1: The switching indication information is used to indicate a switching priority of each PDU session in the established PDU sessions. S220 includes the following: The network device determines, as the target PDU session, a PDU session with a highest switching priority in the established PDU sessions. It should be understood that in this embodiment of this application, the switching priority of each PDU session may be a number representing a priority. For example, a priority 1 represents a highest priority, that is, a PDU session with this priority is preferably switched to a second network; and a priority 100 represents a lowest priority. If there are currently five PDU sessions: a session 1, a session 2, a session 3, a session 4, and a session 5, and priorities of the five PDU sessions are respectively 1, 2, 3, 4, and 5 in descending order, the network device determines the session 1 as the target PDU session.

Case 2: The switching indication information is used to indicate whether each PDU session in the established PDU sessions can be switched. For example, the switching indication information may be an indication field. For example, when an indication field of a PDU session is 1, it indicates that the PDU session can be switched; and when an indication field of a PDU session is 0, it indicates that the PDU session cannot be switched. S220 includes the following: When the switching indication information indicates that there is only one PDU session that can be switched, the network device determines the PDU session that can be switched as the target PDU session. In other words, there is only one PDU session that can be switched, and the PDU session is the target PDU session. Alternatively, when the switching indication information indicates that there are at least two PDU sessions that can be switched, the network device determines the target PDU session from the at least two PDU sessions. For example, the network device may randomly select one PDU session from the at least two PDU sessions as the target PDU session or select one PDU session as the target PDU session based on assistance information.

Optionally, in Case 2, that when the switching indication information indicates that there are at least two PDU sessions that can be switched, the network device determines the target PDU session from the at least two PDU sessions includes the following: If the at least two PDU sessions belong to a same control plane function network element, the network device determines each of the at least two sessions as the target PDU session, that is, the network device may determine, as the target PDU sessions, the at least two PDU sessions belonging to the same control plane function network element, and switch the target PDU sessions to the second network. Alternatively, if the at least two PDU sessions belong to different control plane function network elements, the network device determines the target PDU session from the at least two PDU sessions based on assistance information of each of the at least two PDU sessions. Optionally, the network device may determine switching priorities of the at least two PDU sessions based on the assistance information of each PDU session. The network device determines the target PDU session from the at least two PDU sessions based on the switching priorities of the at least two PDU sessions.

Optionally, the assistance information includes at least one of the following: an internet protocol IP address version corresponding to the PDU session, single network slice selection assistance information (S-NSSAI) corresponding to the PDU session, a session and service continuity (SSC) mode corresponding to the PDU session, an allocation and retention priority (ARP) corresponding to the PDU session, a service type corresponding to the PDU session, and an establishment time corresponding to the PDU session. For example, the switching indication information indicates that a PDU session 1 and a PDU session 2 can be switched. For example, if the PDU session 1 belongs to a voice service and the PDU session 2 belongs to a network data service, the network device may determine the PDU session 1 as the target PDU session; or the network device may determine that a priority of the PDU session 1 is higher than that of the PDU session 2, and determine the session 1 as the target PDU session when no other PDU session with a higher priority exists. For another example, if an SSC mode of a PDU session 1 is a mode 3 and an SSC mode of a PDU session 2 is a mode 2, the network device may determine the PDU session 1 as the target PDU session; or the network device determines that a priority of the PDU session 1 is higher than that of the PDU session 2, and the network device may determine the PDU session 1 as the target PDU session when no other PDU session with a higher priority exists. For another example, if S-NSSAI to which a PDU session 1 belongs has a higher priority during configuration and S-NSSAI to which a PDU session 2 belongs has a lower priority during configuration, the network device may determine the PDU session 1 as the target PDU session; or the network device may determine that a priority of the PDU session 1 is higher than that of the PDU session 2, and the network device may determine the PDU session 1 as the target PDU session when no other PDU session with a higher priority exists. For another example, when an SSC mode corresponding to a PDU session is an SSC mode 3, the network device determines, based on a session establishment time, a subsequently established PDU session as the target PDU session; or the network device sets a priority of a subsequently established PDU session to be higher than that of a previously established PDU session, and determines the subsequently established PDU session with a higher priority as the target PDU session. For another example, the network device may determine the target PDU session according to a locally configured policy and based on an IP address version corresponding to the PDU session, for example, determine a PDU session whose IP address version is v6 as the target PDU session; or the network device may set a priority of a PDU session according to a locally configured policy and based on an IP address version corresponding to the PDU session, for example, the locally configured policy is preferably switching a PDU session whose IP version is v6. For another example, the network device may determine a priority of a PDU session based on a service type of the PDU session, and determine a PDU session whose service type is voice as the target PDU session, or set a higher priority for a PDU session whose service type is voice.

It should be understood that the foregoing two cases are merely examples for description. In actual application, the switching indication information may have another indication function. This is not limited in this embodiment of this application.

In an optional embodiment, before S210, the method further includes the following: The network device obtains the switching indication information of the PDU sessions established by the terminal in the first network, and all the established PDU sessions have a same data network name.

The network device may obtain, in the following several manners, the switching indication information of the PDU sessions established by the terminal in the first network.

Manner 1: The network device receives the switching indication information that is of the PDU sessions established by the terminal in the first network and that is sent by at least one control plane function network element. To be specific, each of the at least one control plane function network element can obtain switching indication information of a PDU session corresponding to each control plane function network element. For example, each control plane function network element may obtain switching indication information that is of a corresponding PDU session and that is sent by the terminal, and each control plane function network element may send, to the network device, switching indication information that is of the corresponding PDU session and that is determined by the control plane function network element. Alternatively, each control plane function network element may adjust switching indication information that is of a corresponding PDU session and that is sent by the terminal to obtain adjusted switching indication information of the PDU session, and then send the adjusted switching indication information of the PDU session to the network device. For example, the network device may be an access and mobility management function device or a user data management network element. In this way, the access and mobility management function device can determine the target PDU session from the established PDU sessions based on the switching indication information of the established PDU sessions, or the user data management network element can determine the target PDU session from the established PDU sessions based on the switching indication information of the established PDU sessions.

Manner 2: The network device is a user data management network element, for example, may be the foregoing HSS+UDM; or may be an access and mobility management function device. The network device receives assistance information that is of a first PDU session in the established PDU sessions and that is sent by a first control plane function network element, and the network device determines switching indication information of the first PDU session based on the assistance information. The assistance information may be the foregoing assistance information. Herein, an example in which the switching indication information indicates a switching priority of a PDU session is used for description. For example, the network device may determine a higher priority for a corresponding PDU session with a higher S-NSSAI priority, and determine a lower priority for a corresponding PDU session with a lower S-NSSAI priority. For another example, when an SSC mode corresponding to a PDU session is an SSC mode 3, the network device sets, based on a session establishment time, a priority of a subsequently established PDU session to be higher than that of a previously established PDU session. For another example, the network device may set a priority of a PDU session according to a locally configured policy and based on an IP address version corresponding to the session. For example, the locally configured policy is preferably switching a PDU session whose IP version is v6. For another example, the network device may determine a priority of a first PDU session based on a service type of the first PDU session, and set a higher priority for a PDU session whose service type is voice.

In Manner 2, the method further includes the following: When the network device is a user data management network element, the user data management network element sends the switching indication information of the first PDU session to the first control plane function network element. Optionally, the first control plane function network element may send the switching indication information of the first PDU session to the terminal.

Manner 3: The network device is a user data management network element, for example, may be the foregoing HSS+UDM. The user data management network element receives initial switching indication information that is of a second PDU session in the established PDU sessions and that is sent by a second control plane function network element. The user data management network element adjusts the initial switching indication information to obtain switching indication information of the second PDU session, that is, the user data management network element may adjust the initial switching indication information that is of the second PDU session and that is sent by the second control plane function network element. For example, the user data management network element has stored switching indication information that is of a PDU session 1 and that is sent by a control plane function network element 1. When receiving switching indication information (initial switching indication information) that is of a PDU session 2 (the second PDU session) and that is sent by a control plane function network element 2 (the second control plane function network element), the user data management network element finds that the switching indication information of the PDU session 1 is the same as that of the PDU session 2, and that the PDU session 1 and the PDU session 2 have a same data network name. When the PDU session 1 and the PDU session 2 belong to different user plane function network elements, the user data management network element may adjust the switching indication information of the PDU session 2 to be different from the switching indication information of the PDU session 1, for example, adjust the switching indication information of the PDU session 2 based on at least one of subscription data of the PDU session 1 and the PDU session 2, identifiers of control plane function network elements corresponding to the PDU session 1 and the PDU session 2, and a local policy. The local policy may be a policy preset by the user data management network element, or may be a policy obtained based on historical data. For another example, the network device adjusts the switching indication information of the PDU session 2 based on the foregoing assistance information. This is not limited in this embodiment of this application.

In Manner 3, the method further includes the following: The user data management network element sends the switching indication information of the second PDU session to the second control plane function network element. To be specific, the user data management network element sends, to the second control plane function network element, the switching indication information that is of the second PDU session and that is obtained through adjustment. Optionally, the second control plane function network element may send the switching indication information of the second PDU session to the terminal. Optionally, the second control plane function network element may send the switching indication information of the second PDU session to an access and mobility management function device.

Manner 4: The network device is a user data management network element. For example, the network device may be the foregoing HSS+UDM. In this case, the user data management network element may determine switching indication information of each of the established PDU sessions. To be specific, the user data management network element may determine the switching indication information of each PDU session based on subscription data of the PDU session and according to a local policy. For example, the local policy may be the switching indication information of each PDU session that is determined based on the assistance information.

It should be understood that an obtaining manner in which the network device obtains the switching indication information of each PDU session from the switching indication information of the established PDU sessions may be one of the foregoing four manners. Optionally, the switching indication information of all the PDU sessions is obtained in a same manner. Alternatively, if there are multiple established PDU sessions, switching indication information of at least two of the multiple PDU sessions may be obtained in different manners, for example, in two of the foregoing four manners.

S220. The network device sends session information of the target PDU session to a mobility management entity device in the second network, so that the mobility management entity device in the second network determines the session information of the target PDU session based on the session information of the target PDU session.

Optionally, the session information of the target PDU session includes an identifier of a control plane function network element corresponding to the target PDU session and a data network name of the target PDU session. In this way, the mobility management entity device in the second network can determine, based on the identifier of the control plane function network element corresponding to the target PDU session, the control plane function network element corresponding to the target PDU session. The mobility management entity device in the second network transparently transmits, to the control plane function network element corresponding to the target PDU session, the identifier that is of the target PDU session and that is sent by the terminal. The control plane function network element corresponding to the target PDU session searches for the target PDU session based on the identifier of the target PDU session, and selects the target PDU session for switching if the target PDU session is found.

Optionally, the first network may be a 5G network, and the second network may be a 4G network.

Optionally, the network device may be an access and mobility management function entity, for example, may be the foregoing AMF in FIG. 1. Optionally, the network device may be a user data management network element, for example, may be the foregoing HSS+UDM in FIG. 1. A specific type of the network device is not limited in this embodiment of this application.

Optionally, in this embodiment of this application, the target PDU session is used as a PDU session to be switched to the second network, and a PDU session other than the target PDU session in the PDU sessions established by the terminal in the first network may be released.

Therefore, according to the communication method provided in this embodiment of this application, the network device may determine, based on the switching indication information, the target PDU session from the PDU sessions established by the terminal in the first network. In this way, the target PDU session may be used as a PDU session that can be switched to the second network, so as to avoid an uncontrolled situation caused when all the PDU sessions established by the terminal in the first network need to be switched to a same control plane function network element in the second network. This helps control switching of a PDU session, thereby improving system performance.

FIG. 3 shows a communication method 300 according to an embodiment of this application. The method 300 includes the following steps.

S310. A terminal obtains switching indication information of protocol data unit PDU sessions established in a first network, where all the established PDU sessions have a same data network name DNN. Optionally, there may be one or more PDU sessions established in the first network.

It should be understood that the switching indication information of the established PDU sessions may include the following: There may be corresponding switching indication information for each of the established PDU sessions, and PDU sessions corresponding to same or different switching indication information may exist in the established PDU sessions. Alternatively, there is switching indication information corresponding to at least one PDU session in the established PDU sessions. For example, the switching indication information may indicate whether the PDU session can be switched. For example, if only one of three PDU sessions can be switched, there is switching indication information corresponding to the PDU session, and the switching indication information indicates that the PDU session can be switched. Whether the remaining two PDU sessions can be switched may not be indicated, and it is considered by default that the remaining two PDU sessions cannot be switched.

The terminal may obtain, in the following three manners, the switching indication information of the PDU sessions established in the first network.

Manner 1: The terminal determines the switching indication information of the established PDU sessions. For example, the terminal determines switching indication information of at least one PDU session according to a local policy. In the local policy, the switching indication information of the established PDU sessions may be determined based on S-NSSAI of PDU sessions with a same DNN. For example, if specific S-NSSAI has a relatively high priority in a configuration process, a PDU session corresponding to the S-NSSAI has a highest priority; or switching indication information of a PDU session may be determined based on a service type carried by the PDU session; or switching indication information of a PDU session is determined based on a combination of the S-NSSAI and the service type. For example, the switching indication information indicates a switching priority. When the terminal determines, based on S-NSSAI, switching priorities of the PDU sessions established in the first network, the terminal may configure a correspondence between S-NSSAI and a switching priority, as described in Table 1; and the terminal may configure a correspondence between a service type and a switching priority, as described in Table 2.

TABLE 1

| S-NSSAI 1 | Priority = 1 |
| S-NSSAI 2 | Priority = 2 |
| S-NSSAI 3 | Priority = 3 |
| S-NSSAI 4 | Priority = 4 |

TABLE 2

| Signaling | Priority = 1 |
| Voice | Priority = 2 |
| Internet of things (Internet od things, IoT) | Priority = 3 |
| Internet (Internet) | Priority = 4 |

It should be understood that when the switching indication information indicates a switching priority, the terminal may not change switching indication information of a previously established PDU session when determining switching indication information of a subsequently established PDU session. For example, the terminal determines the switching indication information of the PDU session according to a determined rule.

When the switching indication information indicates whether a PDU session can be switched, the terminal determines whether the PDU session can be switched. The terminal may determine, based on S-NSSAI corresponding to the PDU session, that the PDU session can be switched. In this case, the terminal changes switching indication information of a previously established PDU session when determining switching indication information of a subsequently established PDU session. As described in Table 1, the terminal first establishes a PDU session in a network slice corresponding to the S-NSSAI 4. The PDU session is the first PDU session corresponding to the DNN, and the terminal determines that the PDU session can be switched. Afterwards, the terminal establishes a new PDU session in a network slice corresponding to the S-NSSAI 1. Because a priority of the S-NSSAI 1 is higher than that of the S-NSSAI 4, the terminal sets the PDU session in the network slice corresponding to the S-NSSAI 1 to be switchable, and sets the PDU session previously established in the network slice corresponding to the S-NSSAI 4 to be non-switchable. For example, when establishing a new PDU session in an SSC mode 2, the terminal sets the new PDU session to be switchable, and sets a PDU session, in the SSC mode 2, with a same DNN as the new PDU session to be non-switchable. Optionally, each time the terminal determines switching indication information of a PDU session, the terminal may send the switching indication information of the PDU session to a corresponding control plane function network element.

It should be understood that when switching indication information of a newly established PDU session affects switching indication information of an established PDU session, for example, the newly established PDU session is determined by the terminal as "switchable", and consequently the previously established PDU session with a same DNN as the newly established PDU session is determined as "non-switchable", the terminal sends the switching indication information of the newly established PDU session to a control plane function network element, and the control plane function network element sends the switching indication information of the newly established PDU session to an HSS+UDM. When receiving the switching indication information of the PDU session, the HSS+UDM sets the switching indication information of the PDU session that has a same DNN as the PDU session and that is previously determined as "switchable" to be non-switchable, and notifies a control plane function network element corresponding to the PDU session of this setting.

Manner 2: The terminal receives the switching indication information of the established PDU sessions that is sent by at least one control plane function network element. The at least one control plane function network element may send, to the terminal, switching indication information that is of a corresponding PDU session and that is determined by the at least one control plane function network element. For example, the control plane function network element determines the switching indication information of the PDU session based on assistance information of the PDU session, and sends the determined switching indication information of the PDU session to the terminal. For a specific method for determining the switching indication information of the PDU session based on the assistance information of the PDU session, refer to the description in the method 200. Alternatively, each of the at least one control plane function network element may obtain switching indication information that is of a PDU session corresponding to the control plane function network element and that is sent by a user data management network element, and send the switching indication information of the PDU session to the terminal. How each of the at least one control plane function network element obtains the switching indication information of the PDU session corresponding to the control plane function network element is not limited in this embodiment of this application.

Manner 3: The terminal sends initial switching indication information of the first PDU session to a second control plane function network element, where the initial switching indication information is used to determine switching indication information of the first PDU session. The terminal receives switching priority information that is of the first PDU session and that is sent by the second control plane function network element. To be specific, the terminal sends, to the second control plane function network element, the initial switching indication information that is of the first PDU session and that is determined by the terminal, and the second control plane function network element may adjust the initial switching indication information that is of the first PDU session and that is sent by the terminal. For example, the second control plane function network element has determined switching indication information of a PDU session 1. When the second control plane function network element receives switching indication information that is of a PDU session 2 (the first PDU session) and that is sent by the terminal, the second control plane function network element determines that the PDU session 1 and the PDU session 2 belong to a same second control plane function network element and a same user plane function network element, and the second control plane function network element finds that the switching indication information of the PDU session 1 is different from that of the PDU session 2, the second control plane function network element adjusts initial switching indication information of the PDU session 2 to the switching indication information of the PDU session 1. That is, the second control plane function network element may adjust, based on switching indication information that is of a PDU session and that is sent by the terminal and switching indication information that is of a PDU session and that is stored by the second control plane function network element, the switching indication information that is of the PDU session and that is sent by the terminal. For another example, the second control plane function network element has determined switching indication information of a PDU session 1. When the second control plane function network element receives switching indication information that is of a PDU session 2 and that is sent by the terminal, and the switching indication information of the PDU session 1 is the same as that of the PDU session 2 but user plane function network elements of the PDU session 1 and the PDU session 2 are different, the second control plane function network element adjusts the switching indication information of the PDU session 2 to be different from the switching indication information of the PDU session 1. For example, when the switching indication information is used to indicate a priority of a PDU session, the second control plane function network element may adjust a priority of the PDU session 2 to be lower or higher than that of the PDU session 1. The foregoing is only an example for describing the following: The second control plane function network element has a function of adjusting switching indication information of a PDU session. Specifically, an adjustment manner and an adjustment policy are not limited in this embodiment of this application.

It should be understood that if the terminal determines the first PDU session as a target PDU session, a first control plane function network element is the second control plane function network element.

S320. The terminal determines the target PDU session from the established PDU sessions based on the switching indication information. Optionally, there may be one or more target PDU sessions. This is not limited in this embodiment of the present invention.

In this embodiment of this application, the switching indication information has at least two different indication functions, and two cases are described below.

Case 1: The switching indication information is used to indicate a switching priority of each of the established PDU sessions, and S320 includes the following: The terminal determines, as the target PDU session, a PDU session with a highest switching priority in the established PDU sessions. For example, if there is one PDU session with a highest switching priority, the one PDU session is the target PDU session; or if there are at least two PDU sessions with a highest switching priority, the at least two PDU sessions are target PDU sessions. Specifically, for a concept of the switching priority, refer to the description in the method 200.

Case 2: The switching indication information is used to indicate whether each of the established PDU sessions can be switched. For example, the switching indication information may be an indication field. For example, when an indication field of a PDU session is 1, it indicates that the PDU session can be switched; and when an indication field of a PDU session is 0, it indicates that the PDU session cannot be switched. S320 includes the following: The terminal determines, as the target PDU session, a PDU session indicated by the switching indication information as "switchable". To be specific, if the switching indication information indicates that there is one PDU session that can be switched, the PDU session is the target PDU session; or if the switching indication information indicates that there are multiple PDU sessions that can be switched, all the multiple PDU sessions can be target PDU sessions. The plurality of target PDU sessions may be corresponding to a same control plane function network element and a same user plane function network element. For example, the control plane function network element may be an SMF+PGW-C, and the user plane function network element may be a UPF+PGW-U.

S330. The terminal sends an identifier of the target PDU session to the first control plane function network element by using a mobility management entity device in a second network.

In an optional embodiment, S330 includes the following: The terminal sends the identifier of the target PDU session and a DNN of the target PDU session to the mobility management entity device. The DNN of the target PDU session is used by the mobility management entity device to determine the first control plane function network element, so that the mobility management entity device sends the identifier of the target PDU session to the first control plane function network element. In other words, the terminal may send the identifier of the target PDU session and the data network name of the target PDU session to the mobility management entity device in the second network. The mobility management entity device in the second network may determine, based on the data network name of the target PDU session, the first control plane function network element corresponding to the target PDU session. Specifically, the user data management network element may send, to the mobility management entity device in the second network, an identifier of a control plane function network element corresponding to each data network name. After receiving the identifier that is of the control plane function network element corresponding to each data network name and that is sent by the user management network element, the mobility management entity device in the second network searches, based on the data network name that is of the target PDU session and that is sent by the terminal, for the first control plane function network element corresponding to the determined target PDU session. The mobility management entity device in the second network may send the identifier of the target PDU session to the first control plane function network element. In this way, the first control plane function network element can determine, based on the identifier of the target PDU session, a PDU session that needs to be switched. For example, the mobility management entity device in the second network may be an MME. For example, the terminal sends the ID of the target PDU session and a DNN 1 of the target PDU session to the mobility management entity device in the second network. The user management network element determines a target PDU session (a PDU session with a highest priority or a PDU session that can be switched) corresponding to each DNN; sends, to the mobility management entity in the second network, the DNN 1 and a control plane function network element 1 corresponding to the DNN 1 (a PDU session corresponding to the control plane function network element 1 is a target PDU session, and a data network name of the target PDU session is the DNN 1); and also sends, to the mobility management entity device, a DNN 2 and a control plane function network element 2 corresponding to the DNN 2 (a PDU session corresponding to the control plane function network element 2 is a target PDU session, and a data network name of the target PDU session is the DNN 2). The mobility management in the second network may determine that the DNN 1 is corresponding to the control plane function network element 1, and therefore the mobility management entity device in the second network may send the identifier of the target PDU session to the control plane function network element 1 (the first control plane function network element). In this way, the control plane function network element 1 may determine the target PDU session that needs to be switched.

In an optional embodiment, that the terminal sends the identifier of the target PDU session and a data network name of the target PDU session to the mobility management entity device includes the following: The terminal sends a first request message to the mobility management entity device. The first request message carries the identifier of the target PDU session and the data network name of the target PDU session, and the first request message is an attach request message or a session establishment request message. To be specific, after determining the target PDU session, the terminal may add the identifier of the target PDU session and the data network name of the target PDU session to the attach request message when sending the attach request message to the mobility management entity device in the second network, or may add the identifier of the target PDU session and the data network name of the target PDU session to the session establishment request message. A manner in which the terminal sends the identifier of the target PDU session and the data network name of the target PDU session to the mobility management entity device in the second network is not limited in this embodiment of this application.

Figure 4:
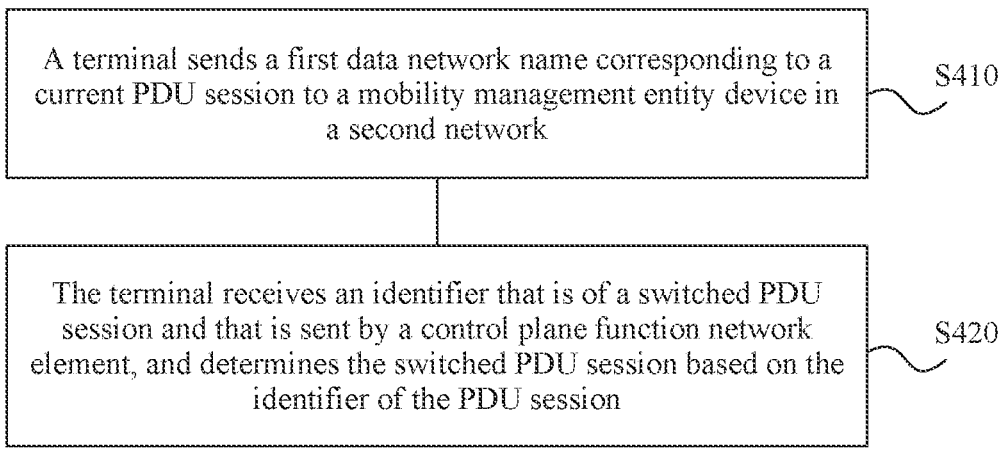
FIG. 4 is a schematic diagram of another communication method according to an embodiment of this application.

FIG. 4 shows a communication method 400 according to an embodiment of this application. The method 400 includes the following steps.

S410. A terminal sends a first data network name corresponding to a current PDU session to a mobility management entity device in a second network, so that the mobility management entity device in the second network can determine a control plane function network element corresponding to the current PDU session. For a specific determining manner, refer to the method 300. The mobility management entity device in the second network may send, to the control plane function network element, a PDU session (the current PDU session) update request corresponding to a first data network name. After receiving the session update request corresponding to the first data network name, the control plane function network element obtains, based on the first data network name, a PDU session corresponding to the first data network name. If the first data network name is corresponding to one PDU session, the PDU session is a session that needs to be switched; or if the first data network name is corresponding to multiple PDU sessions, the control plane function network element selects one PDU session as a PDU session that needs to be switched. The control plane function network element may randomly select one PDU session as a PDU session that needs to be switched; or determine, based on assistance information of a PDU session, a PDU session that needs to be switched, for example, determine, based on S-NSSAI corresponding to a session, a PDU session that needs to be switched. Alternatively, if an SSC mode of a PDU session is 3, the control plane function network element determines, based on a time at which a PDU session is established, a PDU session that needs to be switched. Alternatively, the control plane function network element determines, based on an IP address version of a PDU session, a PDU session that needs to be switched. Alternatively, optionally, the control plane function network element may search a user data management network element for a session identifier of a PDU session that needs to be switched; and determine, based on the session identifier of the PDU session that needs to be switched, the PDU session that needs to be switched. This is not limited in this embodiment of this application.

Optionally, S410 may include the following: The terminal sends an attach request message or a session establishment request message to the mobility management entity device in the second network. The attach request message or the session establishment request message carries the first data network name corresponding to the current PDU session.

Optionally, if the terminal sends, in the attach request message, the first data network name corresponding to the current PDU session to the mobility management entity device in the second network, after determining a PDU session that needs to be switched, the control plane function network element switches the PDU session to a PDN connection in an attach procedure. Alternatively, if the terminal adds, to the session establishment request message, the data network name corresponding to the current PDU session, after determining a PDU session that needs to be switched, the control plane function network element switches the PDU session to a PDN connection in a session establishment request procedure. After completing switching, the control plane function network element sends the identifier of the switched PDU session to the terminal. For example, the control plane function network element sends a protocol configuration option (PCO) to the terminal, and the PCO carries the identifier of the switched PDU session.

S420. The terminal receives the identifier that is of the switched PDU session and that is sent by the control plane function network element, and determines the switched PDU session based on the identifier of the PDU session. Optionally, the terminal receives the PCO sent by the control plane function network element, obtains the identifier of the switched PDU session from the PCO, and determines the switched PDU session based on the identifier of the PDU session. In this way, UE can associate a PDN connection with a corresponding session.

Figure 5:
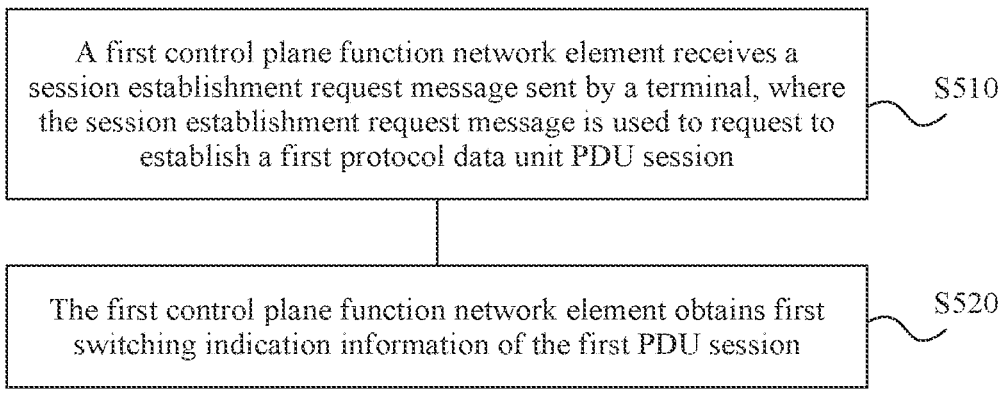
FIG. 5 is a schematic diagram of still another communication method according to an embodiment of this application.

FIG. 5 shows a communication method 500 according to an embodiment of this application. The method 500 includes the following steps.

S510. A first control plane function network element receives a session establishment request message sent by a terminal, where the session establishment request message is used to request to establish a first protocol data unit PDU session.

S520. The first control plane function network element obtains switching indication information of the first PDU session. Optionally, the switching indication information is used to indicate a priority of the first PDU session or used to indicate whether the first PDU session can be switched.

The first control plane function network element obtains first switching indication information of the first PDU session in the following five manners.

Manner 1: The session establishment request message in S510 carries the switching indication information of the first PDU session. The first control plane function network element may determine the switching indication information of the first PDU session from the session establishment request message.

In Manner 1, after obtaining the switching indication information of the first PDU session, the first control plane function network element may send the switching indication information of the first PDU session to a user data management network element. After the user data management network element receives switching indication information that is corresponding to each of multiple PDU sessions (the multiple PDU sessions have a same DNN) and that is sent by multiple control plane function network elements, the user data management network element can store the switching indication information corresponding to each PDU session; and when the terminal is handed over to a second network, determine a target PDU session based on the switching indication information corresponding to each of the multiple PDU sessions, that is, determine a PDU session that can be switched. Alternatively, the first control plane function network element may send the switching indication information of the first PDU session to an access and mobility management function device. After the access and mobility management function device receives switching indication information that is corresponding to each of multiple PDU sessions (the multiple PDU sessions have a same DNN) and that is sent by multiple control plane function network elements, the access and mobility management function device can store the switching indication information corresponding to each PDU session; and when the terminal is handed over, determine a target PDU session based on the switching indication information corresponding to each of the multiple PDU sessions, that is, determine a PDU session that can be switched.

Optionally, the first control plane function network element may send a DNN of the first PDU session and an identifier of the first control plane function network element to the user data management network element. The first control plane function network element may send session information of the first PDU session to the user data management network element, where the session information includes the switching indication information of the first PDU session, the DNN of the first PDU session, and the identifier of the first control plane function network element. In this way, the user data management network element can store the session information of the first PDU session. When receiving session information of multiple PDU sessions (the multiple PDU sessions have a same DNN), the user data management network element determines a target PDU session based on switching indication information of the multiple PDU sessions, and then sends, to a mobility management function entity device in the second network, a DNN of the target PDU session and an identifier of a control plane function network element corresponding to the target PDU session.

Manner 2. The first control plane function network element receives initial switching indication information that is of the first PDU session and that is sent by the terminal. The first control plane function network element obtains the switching indication information that is of the first PDU session and that is obtained through adjustment based on the initial switching indication information.

In Manner 2, the first control plane function network element sends the switching indication information of the first PDU session to the terminal, a user data management network element, or an access and mobility management function.

Manner 3: The first control plane function network element receives initial switching indication information that is of the first PDU session and that is sent by the terminal. The first control plane function network element sends the initial switching indication information of the first PDU session to a user data management network element. The user data management network element adjusts the initial switching indication information of the first PDU session to obtain the switching indication information of the first PDU session. The user data management network element sends the switching indication information of the first PDU session to the first control plane function network element.

In Manner 3, the first control plane function network element sends the first switching indication information to the terminal or an access and mobility management function, that is, the first control plane function network element sends the adjusted switching indication information of the first PDU session to the terminal.

Manner 4: The first control plane function network element sends assistance information of the first PDU session to a user data management network element. The user data management network element determines the switching indication information of the first PDU session based on the assistance information of the first PDU session, and then sends the switching indication information of the first PDU session to the first control plane function network element. The first control plane function network element receives the switching indication information that is of the first PDU session and that is sent by the user data management network element. The assistance information of the first PDU session includes at least one of an internet protocol IP address version corresponding to the first PDU session, single network slice selection assistance information corresponding to the first PDU session, a session and service continuity SSC mode corresponding to the first PDU session, an allocation and retention priority ARP corresponding to the first PDU session, a service type corresponding to the first PDU session, and an establishment time corresponding to the first PDU session.

In Manner 4, the method further includes the following: The first control plane function network element sends the first switching indication information of the first PDU session to the terminal or an access and mobility management function.

Manner 5: The first control plane function network element determines second switching indication information of the first PDU session according to a local policy. The first control plane function network element sends the second switching indication information to a user data management network element. The user data management network element adjusts the second switching indication information to obtain the first switching indication information of the first PDU session, and sends the first switching indication information to the first control plane function network element.

In the foregoing five manners, when the first control plane function network element sends the switching indication information of the first PDU session to the terminal, the terminal may receive switching indication information of multiple PDU sessions (the multiple PDU sessions have a same DNN) that is sent by multiple control plane function network elements, the terminal may determine a target PDU session from the multiple PDU sessions based on the switching indication information of the multiple PDU sessions, and the terminal may send an identifier of the target PDU session and a DNN of the target PDU session to the mobility management function entity device. Alternatively, the first control plane function network element sends the switching indication information of the first PDU session to the user data management network element. Optionally, the first control plane function network element may send the DNN of the first PDU session and the identifier of the first control plane function network element to the user data management network element. The user data management network element may receive switching indication information of multiple PDU sessions (the multiple PDU sessions have a same DNN) that is sent by multiple control plane function network elements, and the user data management network element may determine a target PDU session from the multiple PDU sessions based on the switching indication information of the multiple PDU sessions. The user data management network element sends, to the mobility management function entity device, a DNN of the target PDU session and an identifier of a control plane function network element corresponding to the target PDU session. Alternatively, the first control plane function network element sends the switching indication information of the first PDU session to an access and mobility management function. Optionally, the first control plane function network element may send the DNN of the first PDU session and the identifier of the first control plane function network element to the access and mobility management function. The access and mobility management function may receive switching indication information of multiple PDU sessions (the multiple PDU sessions have a same DNN) that is sent by multiple control plane function network elements, and the access and mobility management function may determine a target PDU session from the multiple PDU sessions based on the switching indication information of the multiple PDU sessions. The access and mobility management function sends, to the mobility management function entity device in the second network, a DNN of the target PDU session and an identifier of a control plane function network element corresponding to the target PDU session.

It should be understood that in the embodiments of this application, a same term may be used in the method 200 to the method 500. However, the same term may express different meanings in different methods. For example, the first control plane function network element may be any control plane function network element, and does not represent a same device in the method 200 to the method 500. To be specific, in the embodiments of this application, "first" or "second" does not indicate a specific one, but indicate a general one.

The following details, with reference to the accompanying drawings, communication methods provided in the embodiments of this application. In a method 600 to a method 900, an example is used for description in which a terminal is UE, an access and mobility management function device is an AMF, a mobility management entity device is an MME, a control plane function network element is an SMF+PGW-C, a user data management network element is an HSS+UDM, a first network is a 5G network, a second network is a 4G network, and switching indication information indicates a switching priority. However, this is not limited in the embodiments of this application.

The following separately provides descriptions for whether an N26 interface exists between the MME and the AMF. In the following descriptions, the switching indication information may indicate a switching priority. When the terminal is handed over from a 5G system to an evolved packet system (evolved packet system, EPS), the terminal determines, based on switching indication information corresponding to PDU sessions with a same DNN, a PDU session to be switched to the EPS. In an implementation, to select a target PDU session, the UE sends a switching priority to the SMF+PGW-C, and the SMF+PGW-C may determine a final switching priority and send the final switching priority back to the UE. If one SMF+PGW-C and one UPF+PGW-U serve multiple PDU sessions with a same DNN, the SMF+PGW-C may set priorities of the multiple PDU sessions to a same value.

In a scenario in which the N26 interface is not deployed, the SMF+PGW-C sends a switching priority, a DNN, and an SMF+PGW-C ID to the HSS+UDM. When the UE moves to the EPS, the UE selects a PDU session with a highest switching priority, sends a PDN connection establishment request message to the MME, and adds an ID of the PDU session to a PCO. For a DNN, the HSS+UDM sends an ID of an SMF+PGW-C with a highest switching priority to the MME, so as to switch the PDU session with a highest switching priority to a corresponding PDN connection in the EPS.

In a scenario in which the N26 interface is deployed, the SMF+PGW-C sends a switching priority and a session context to the AMF together. The AMF selects a PDU session with a highest switching priority, and forwards a context of the PDU session to the MME. In this way, the PDU session with a highest switching priority is correspondingly switched to the EPS.

In this way, the solution has no impact on the MME, and has little impact on the HSS+UDM. With this solution, PDU sessions with a same DNN that are served by a same SMF+PGW-C and a same UPF+PGW-U may be switched to the EPS. Such selection can reflect a user requirement. In this solution, the UE may determine a switching priority when establishing a PDU session, for example, determine the switching priority according to the manner in the method 300. The switching priority may be determined by the UE, or the switching priority may be determined by the SMF+PGW-C and/or the HSS+UDM. When a PDU session is being established, the SMF+PGW-C may first determine whether the PDU session can be switched to the 4G network. For example, when a PDU session is in an SSC mode 2, the SMF+PGW-C may determine that the PDU session does not need to be switched to the 4G network. When the SMF+PGW-C registers an SMF+PGW-C ID and a DNN with the HSS+UDM, the SMF+PGW-C may indicate whether a PDU session can be switched to the 4G network. In addition, the SMF+PGW-C may send other assistance information to the HSS+UDM, for example, S-NSSAI, an IP address version, an SSC mode, an ARP, a service type, and an establishment time that are of a PDU session, so that the HSS+UDM determines a switching priority based on the assistance information.

When the HSS+UDM receives registration of a PDU session, if multiple PDU sessions with a same DNN can be switched to the 4G network, the HSS+UDM determines switching priorities of the multiple PDU sessions based on switching assistance information. For example, for PDU sessions with a same DNN in an SSC mode 3, the HSS+UDM may mark a latest PDU session with a higher priority. For different IP versions, the HSS+UDM may configure a default policy to select a PDU session, and the like.

In the scenario in which the N26 interface is not deployed, when the UE moves to the EPS, the UE adds only a DNN to the PDN connection establishment request message sent to the MME, and the UE does not select a to-be-switched PDU session. Therefore, the UE does not add an ID of the PDU session to the PCO. For a DNN, the HSS+UDM may send, to the MME, an ID of an SMF+PGW-C corresponding to a PDU session with a highest priority. After PDN connection establishment is completed in the EPS, the SMF+PGW-C may indicate, to the terminal by using the PCO, an ID of an established PDU session with the DNN, so that the UE can associate a PDN connection with a corresponding session. In the scenario in which N26 is deployed, the AMF may determine a session that can be switched to 4G, and a processing manner is similar to that used by the HSS+UDM.

In the following figures, FIG. 6A to FIG. 9 show scenarios in which the N26 interface is not deployed, and FIG. 10A to FIG. 13 show scenarios in which the N26 interface is deployed.

Figure 6A:
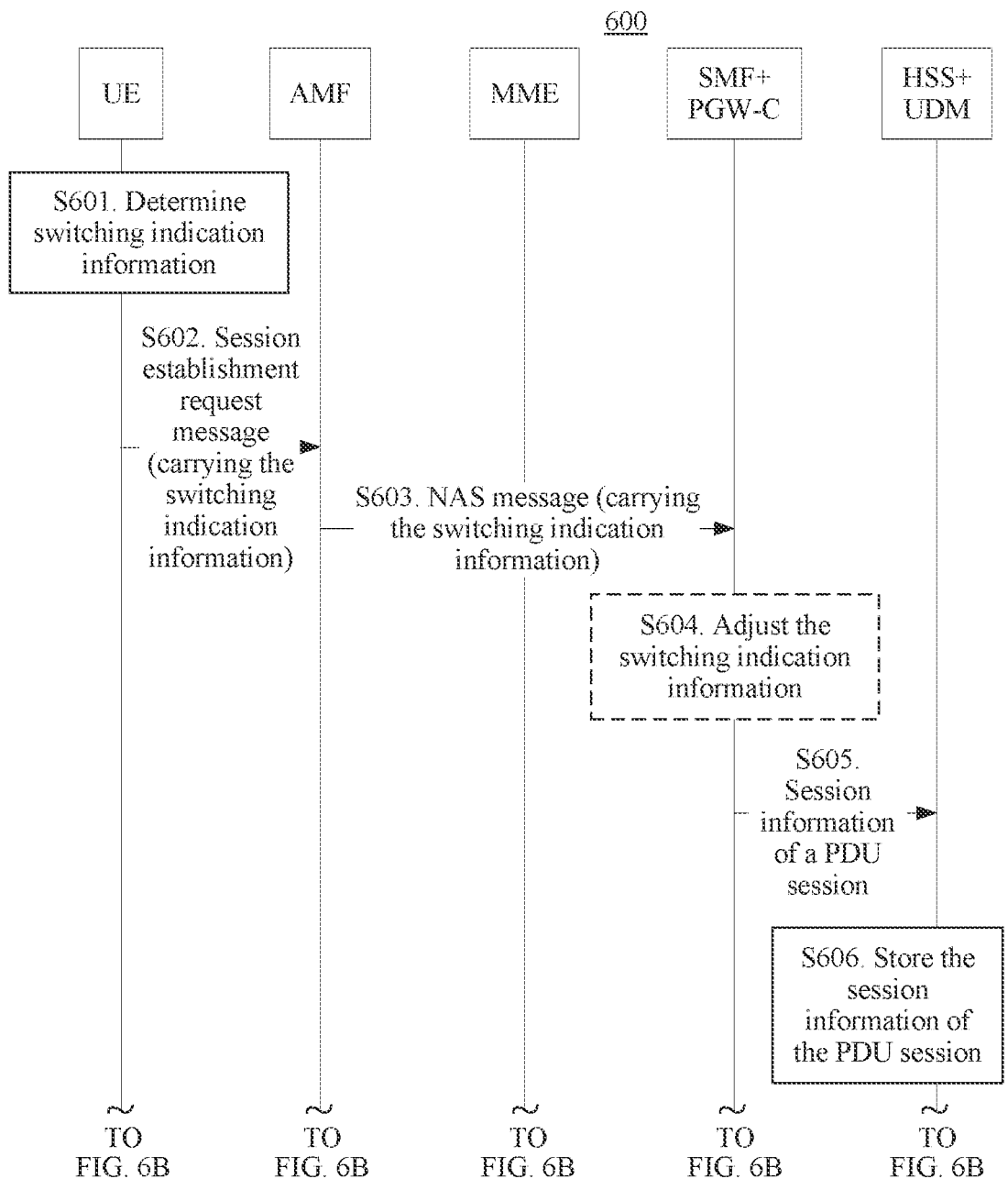
FIG. 6A, FIG. 6B, and FIG. 6C are a schematic diagram of still another communication method according to an embodiment of this application.
Figure 6B:
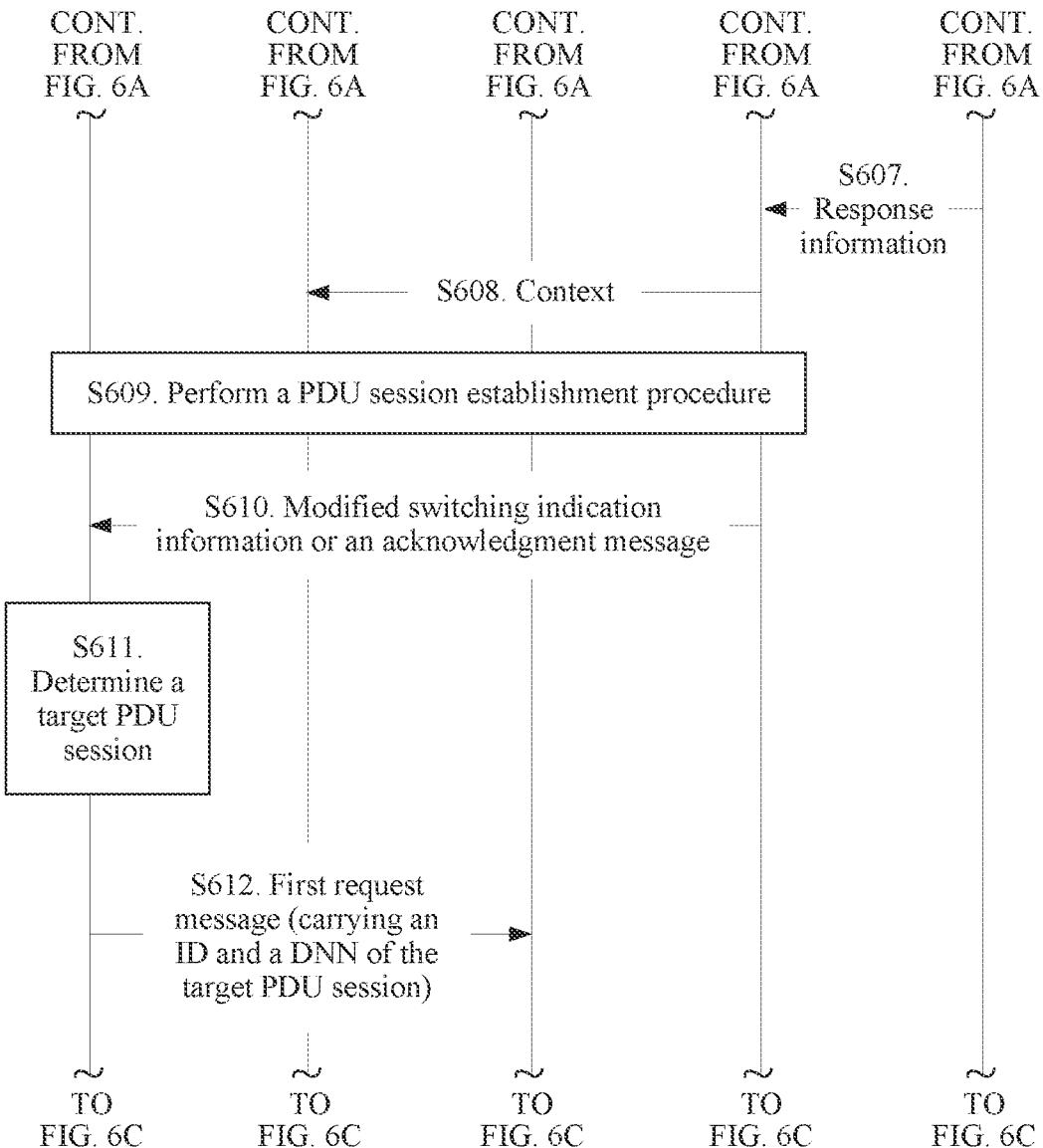
Figure 6C:
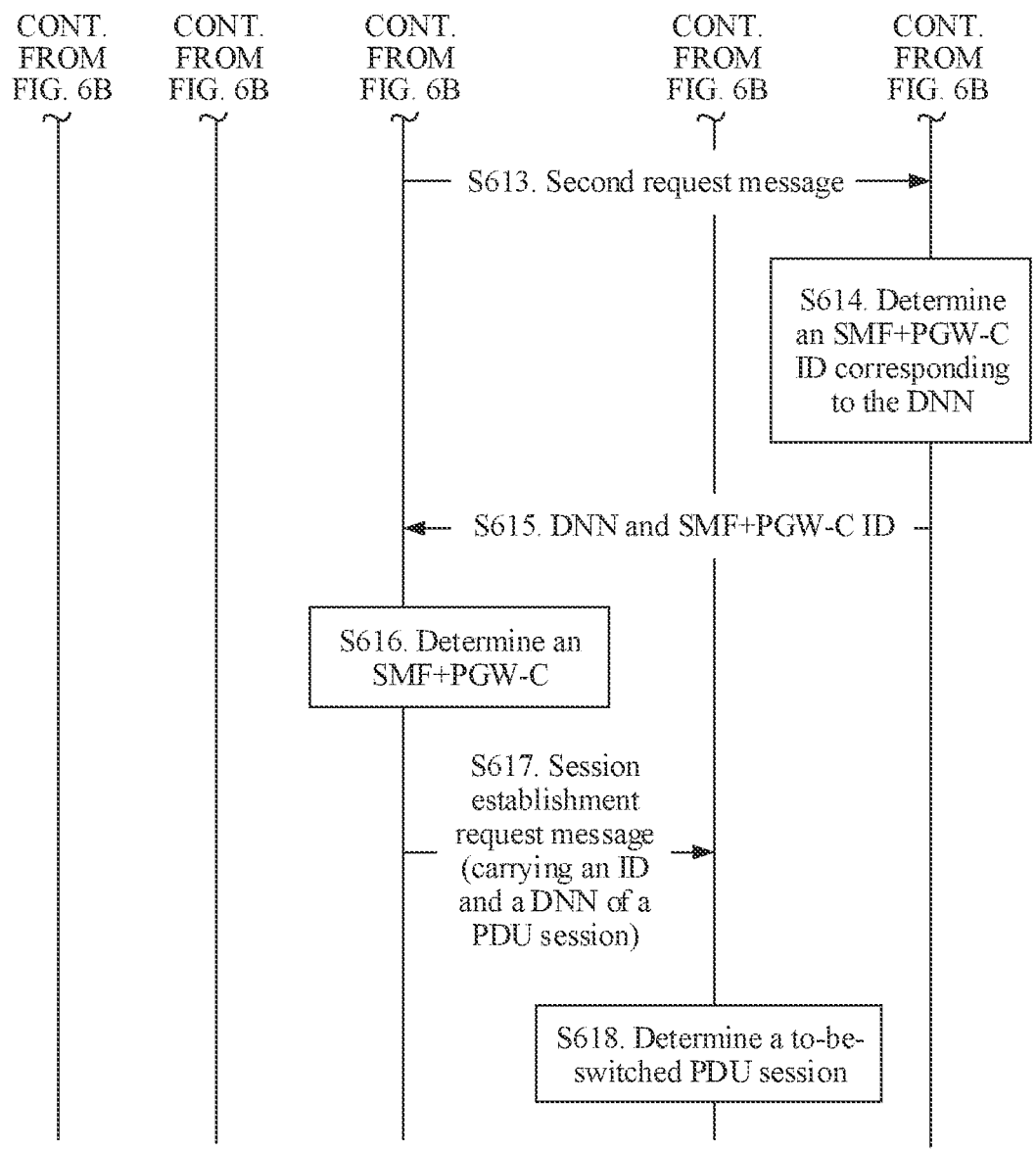

FIG. 6A, FIG. 6B, and FIG. 6C show a communication method 600 according to an embodiment of this application. The method 600 includes the following steps.

S601. UE determines switching indication information of PDU sessions when establishing the PDU sessions in a 5G network, where all the established PDU sessions have a same DNN. The switching indication information of the PDU session indicates a switching priority or indicates whether the PDU session can be switched. For a method for determining the switching indication information of the PDU session by the UE, refer to the method 300.

S602. The UE adds the switching indication information of the established PDU session to a session establishment request message and sends the session establishment request message to an AMF; or the session establishment request message includes a PCO, and the UE may add the switching indication information of the established PDU session to the PCO. After determining switching indication information of each PDU session, the UE may send the switching indication information of the PDU session to the AMF by using the session establishment request message.

S603. The AMF receives the session establishment request message sent by the UE, without parsing out the switching indication information, of the PDU session, included in the session establishment request message, and the AMF directly forwards the switching indication information of the PDU session to an SMF+PGW-C by using a non-access stratum (NAS) message. In other words, one session establishment request message carries one PCO, and the PCO includes switching indication information of a PDU session. For ease of description, only one SMF+PGW-C is shown in FIG. 6A, FIG. 6B, and FIG. 6C. In an actual application process, there may be multiple SMF+PGW-Cs. To be specific, the AMF sends, to each SMF+PGW-C, switching indication information of a PDU session corresponding to the SMF+PGW-C.

S604. The SMF+PGW-C receives the non-access stratum message sent by the AMF, and obtains the switching indication information of the PDU session from the non-access stratum message. Optionally, the SMF+PGW-C may adjust the received switching indication information of the PDU session, and determine final switching indication information of the PDU session. For example, the SMF+PGW-C receives switching indication information of a PDU session 1 and a PDU session 2 that is sent by the terminal, the switching indication information of the PDU session 1 and the switching indication information of the PDU session 2 that are sent by the terminal are different, and UPF+PGW-Us of the PDU session 1 and the PDU session 2 are the same. In this case, the SMF+PGW-C may adjust the switching indication information of the PDU session 1 and the switching indication information of the PDU session 2 to be the same. For another example, switching indication information of a PDU session 1 and switching indication information of a PDU session 2 that are sent by the terminal are the same, and UPF+PGW-Us of the PDU session 1 and the PDU session 2 are different. In this case, the SMF+PGW-C may adjust the switching indication information of the PDU session 1 and the switching indication information of the PDU session 2 to be different.

S605. When the SMF+PGW-C does not adjust the switching indication information of the PDU session, the SMF+PGW-C directly sends received session information of the PDU session to an HSS+UDM. The session information of the PDU session includes the switching indication information of the PDU session, an identifier of the SMF+PGW-C, and a DNN of the PDU session. For example, the identifier of the SMF+PGW-C may be an SMF+PGW-C ID. After adjusting the switching indication information of the PDU session, the SMF+PGW-C sends adjusted switching indication information, the identifier of the SMF+PGW-C, and the DNN of the PDU session to the HSS+UDM. It should be understood that the DNN herein may be learned of by the SMF+PGW-C or sent by the terminal to the SMF+PGW-C. This is not limited in this embodiment of this application.

S606. After receiving the session information that is of the PDU session established by the terminal in the 5G network and that is sent by at least one SMF+PGW-C, the HSS+UDM stores the session information of the established PDU session.

Optionally, if the switching indication information indicates whether the PDU session can be switched, and when the switching indication information indicates that the PDU session can be switched to a 4G network, the HSS+UDM checks other PDU sessions with a same DNN as the PDU session. If the HSS+UDM stores other PDU sessions with a same DNN as the PDU session, and one of these PDU sessions has been identified as "switchable" to the 4G network, the HSS+UDM determines which of the two switchable PDU sessions can be switched to the 4G network. The HSS+UDM may determine, based on assistance information (referring to the foregoing assistance information), a PDU session that can be switched. If the HSS+UDM determines that a previously established PDU session indicated as "switchable" becomes non-switchable, the HSS+UDM notifies an SMF+PGW-C corresponding to the PDU session of this change, and the SMF+PGW-C sets the PDU session to be non-switchable.

S607. The HSS+UDM may return response information to at least one SMF+PGW-C, to indicate that the session information that is of the PDU session and that is sent by the SMF+PGW-C is accepted.

S608. The SMF+PGW-C performs a PDU session establishment procedure, and the SMF+PGW-C creates a context and sends the context to the AMF.

S609. The UE, an access network element, the AMF, the SMF+PGW-C, and the like perform a subsequent PDU session establishment procedure. This step belongs to the prior art, and is not detailed herein.

S610. If the SMF+PGW-C modifies the switching indication information of the PDU session, the SMF+PGW-C sends modified switching indication information to the terminal; or if the SMF+PGW-C does not modify the switching indication information of the PDU session, the SMF+PGW-C returns an acknowledgment message to the terminal, to indicate that the switching indication information sent by the UE is accepted. Optionally, if the switching indication information is not modified by the SMF+PGW-C, the acknowledgment message may still carry the switching indication information that is of the PDU session and that is sent by the UE to the SMF+PGW-C.

S611. When the UE moves to a 4G network, if the UE establishes multiple PDU sessions with a same DNN, the UE determines a target PDU session based on switching indication information of the multiple PDU sessions with a same DNN, where the target PDU session is a PDU session that the UE expects to switch to 4G. When the switching indication information indicates a switching priority, the UE determines a PDU session with a highest priority in the multiple PDU sessions with a same DNN as the target PDU session; or when the switching indication information indicates whether a PDU session can be switched, the UE determines, as the target PDU session, a PDU session that "can be switched" to 4G and that is indicated by the switching indication information.

S612. The UE sends a first request message to an MME, where the first request message carries an ID of the target PDU session and a DNN of the target PDU session. The first request message may be an attach request message, or may be a PDN connection establishment request message. The ID of the target PDU session is included in the PCO.

S613. If the first request message is the attach request message, after receiving the first request message, the MME sends a second request message to the HSS+UDM, to request the session information from the HSS+UDM, where the session information may include a DNN and an SMF+PGW-C ID corresponding to the DNN.

S614. The HSS+UDM determines, from different PDU sessions with a same DNN based on stored session information of the PDU sessions and switching indication information of the PDU sessions with a same DNN, a PDU session with the DNN that can be switched, that is, a target PDU session corresponding to the DNN, and determines an ID of an SMF+PGW-C corresponding to the target PDU session. When the switching indication information indicates a switching priority, the HSS+UDM determines, as the target PDU session, a PDU session with a highest priority in the multiple PDU sessions with a same DNN; or when the switching indication information indicates whether a PDU session can be switched, the HSS+UDM determines, as the target PDU session, a PDU session that "can be switched" to 4G and that is indicated by the switching indication information.

S615. The HSS+UDM sends, to the MME, the DNN of the target PDU session and the SMF+PGW-C ID that are corresponding to the DNN. To be specific, the HSS+UDM stores session information of PDU sessions corresponding to multiple DNNs, and the HSS+UDM may determine a target PDU session corresponding to each DNN and an ID of an SMF+PGW-C corresponding to the target PDU session corresponding to the DNN. Then, the HSS+UDM sends, to the MME, the DNN of the target PDU session corresponding to each DNN and the ID of the SMF+PGW-C corresponding to the target PDU session. For example, the MME receives a DNN 1 and a corresponding SMF+PGW-C 1, and a DNN 2 and a corresponding SMF+PGW-C 2.

S616. After receiving the first request message sent by the UE, the MME determines, based on the DNN that is of the target PDU session and that is carried in the first request message, the DNN that is of the target PDU session corresponding to each DNN and that is obtained in S615, and the ID of the SMF+PGW-C corresponding to the target PDU session, the SMF+PGW-C ID corresponding to the DNN that is of the target PDU session and that is in the first request message, and determines an SMF+PGW—C based on the SMF+PGW-C ID.

S617. The MME sends a session establishment request message to the SMF+PGW-C, where the session establishment request message includes a PCO, and the PCO carries the ID of the target PDU session and the DNN of the target PDU session.

S618. The SMF+PGW-C determines, based on the ID and the DNN of the target PDU session that are sent by the MME, a PDU session that needs to be switched. If the SMF+PGW-C stores the DNN and a session corresponding to the DNN, the SMF+PGW-C selects the PDU session for switching, or if the SMF+PGW-C finds that the target PDU session does not exist, the SMF+PGW-C rejects the PDU session.

Figure 7A:
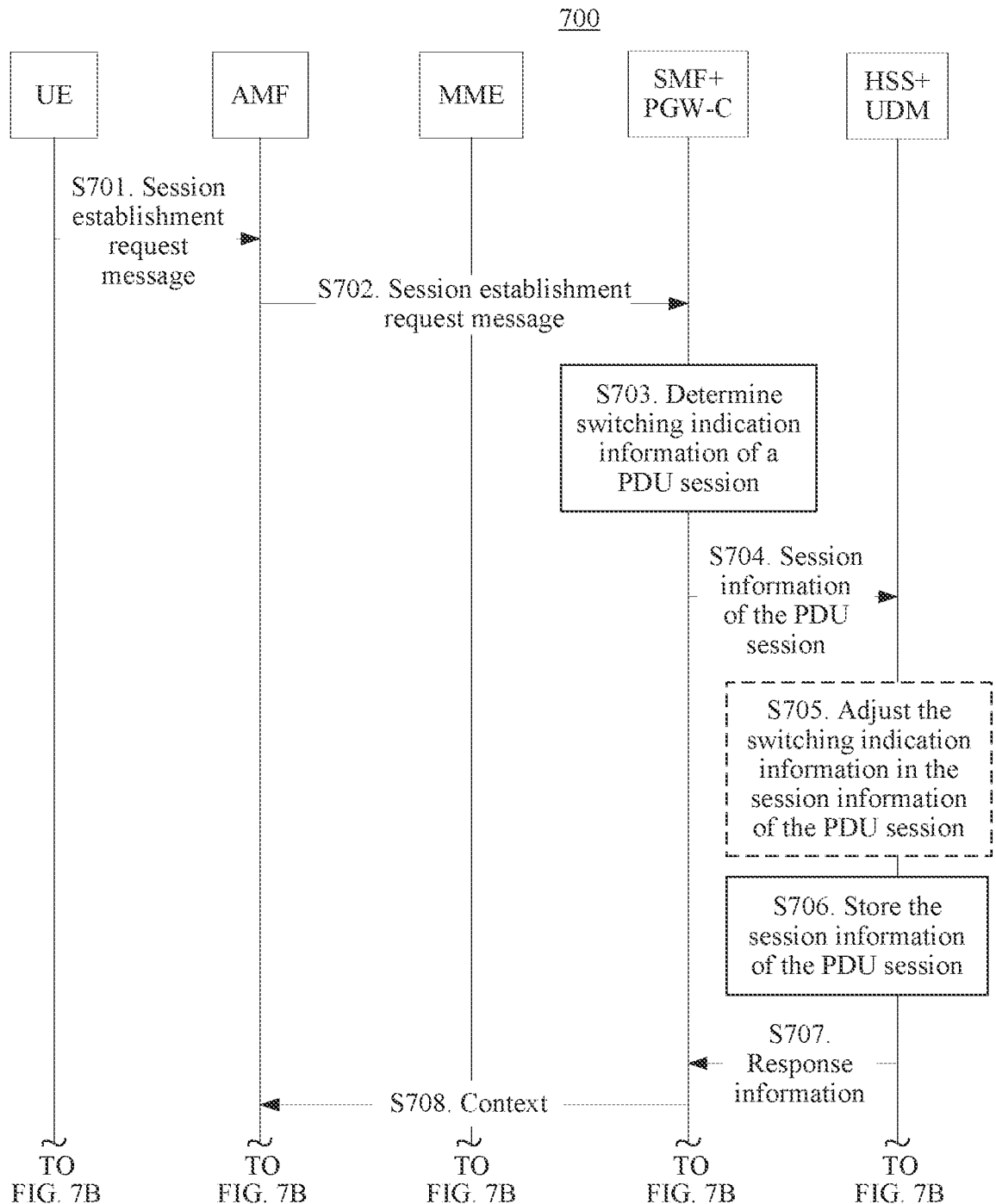
FIG. 7A and FIG. 7B are a schematic diagram of still another communication method according to an embodiment of this application.
Figure 7B:
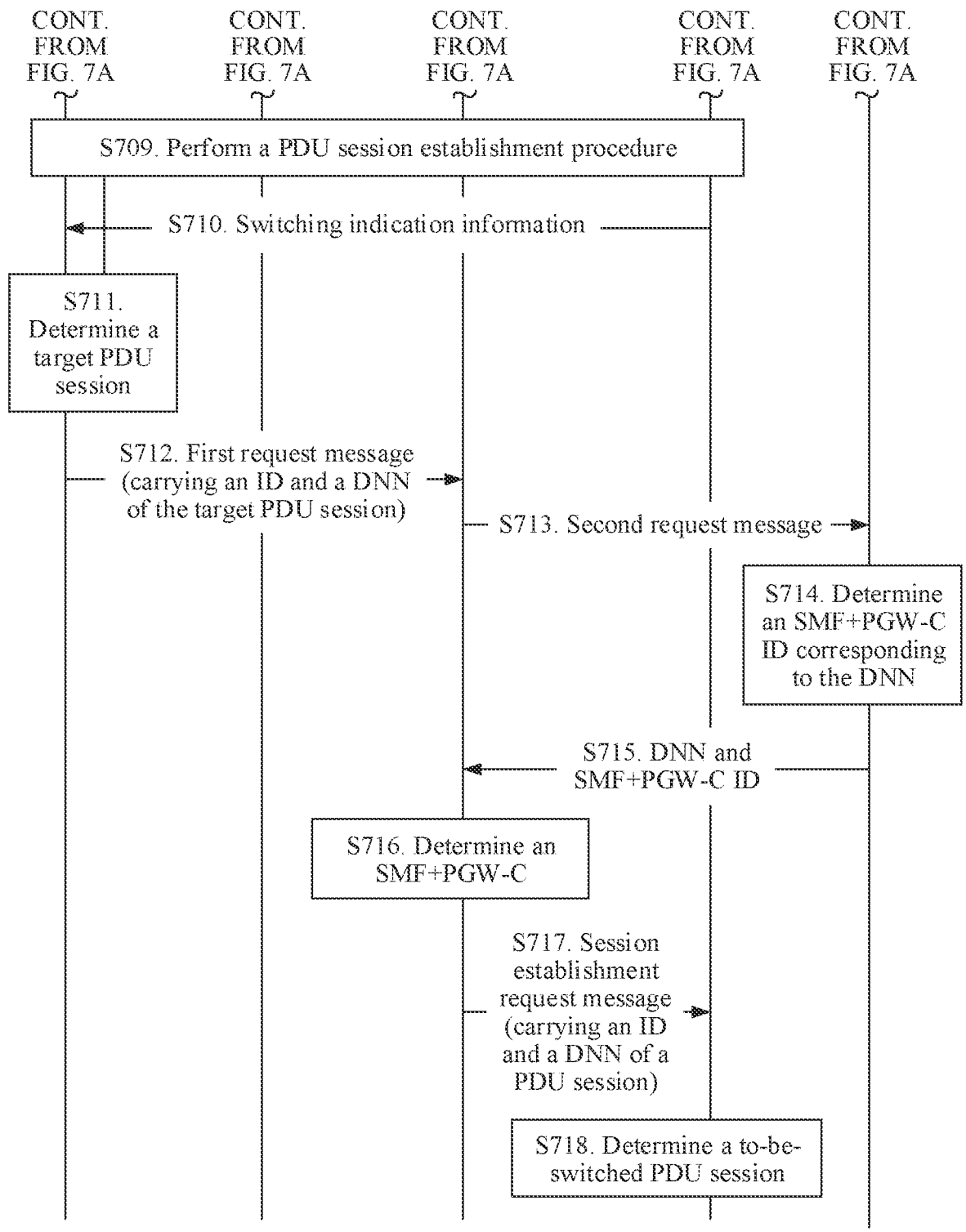

FIG. 7A and FIG. 7B show a communication method 700 according to an embodiment of this application. The method 700 includes the following steps.

S701. UE sends a session establishment request message to an AMF.

S702. The AMF sends a session establishment request message to an SMF+PGW-C.

S703. The SMF+PGW-C determines switching indication information of a PDU session. For example, the SMF+PGW-C may determine the switching indication information of the PDU session based on the foregoing assistance information.

S704 is the same as S605. Optionally, the SMF+PGW-C may send the assistance information to an HSS+UDM, so that when finding that switching indication information from different SMF+PGW-Cs has a conflict, the HSS+UDM adjusts the conflict based on the assistance information.

Optionally, S705, the HSS+UDM may adjust the switching indication information of the PDU session. It is assumed that a priority of a PDU session 1 that is received by the HSS UDM from the first SMF PGW-C is 2, and a priority of a PDU session 2 that is received by the HSS UDM from the second SMF PGW-C is also 2, and the PDU session 1 and the PDU session 2 have a same DNN, then the HSS+UDM may adjust the priority of the PDU session 1 and\or the priority of the PDU session 2 based on the assistance information. For example, the HSS+UDM may adjust the priority of the PDU session 2 to be higher or lower than the priority of the PDU session 1.

S706. The HSS+UDM stores session information of the PDU session.

S707. If the HSS+UDM does not adjust the switching indication information of the PDU session, the HSS+UDM sends response information to the SMF+PGW-C, to indicate that the switching indication information that is of the PDU session and that is sent by the SMF+PGW-C is accepted. Optionally, the response message may carry the accepted switching indication information of the PDU session. Alternatively, if the HSS+UDM adjusts the switching indication information of the PDU session, the HSS+UDM adds adjusted switching indication information of the PDU session to a response message and sends the response message to the SMF+PGW-C.

S708 to S718 are the same as S608 to S618.

Figure 8A:
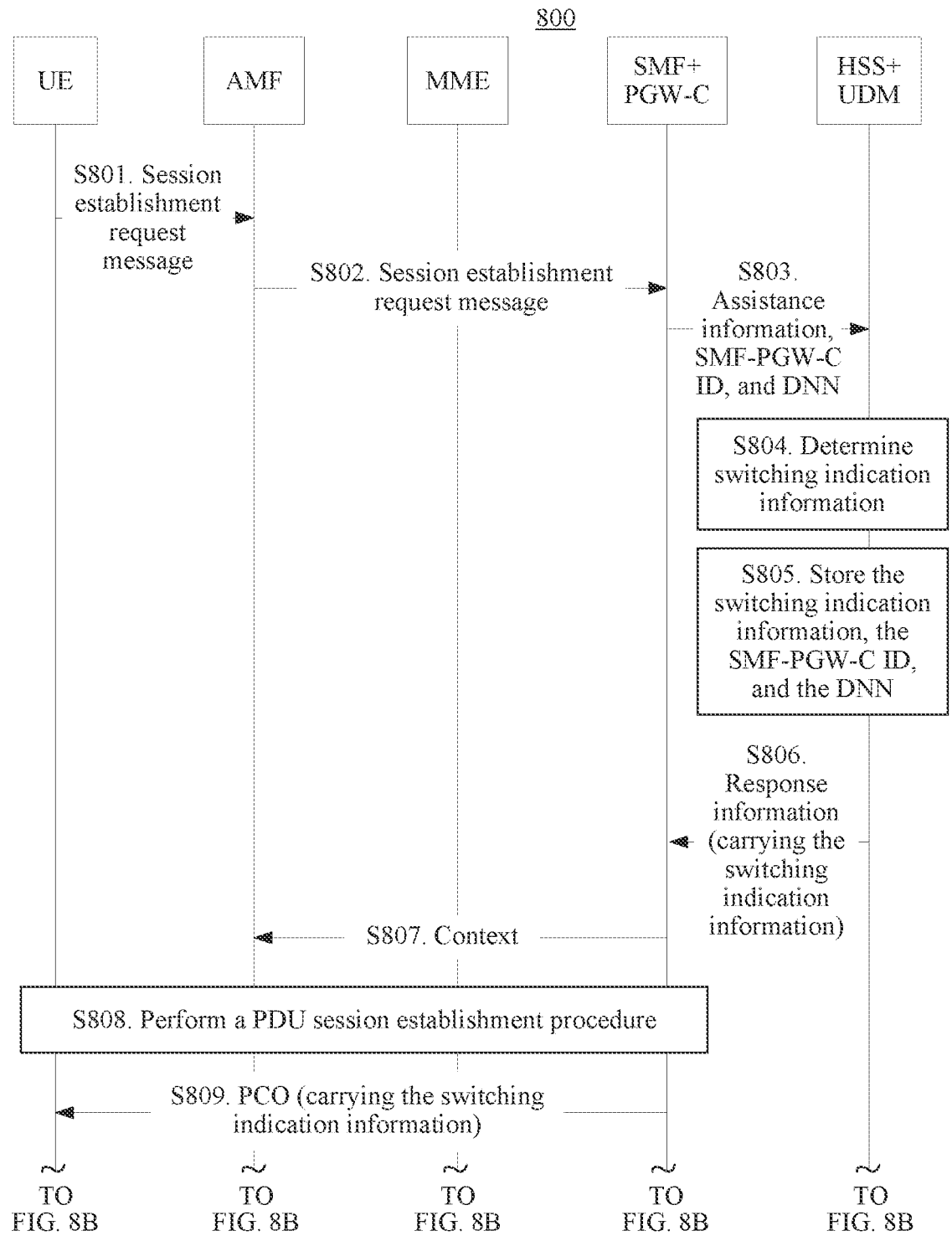
FIG. 8A and FIG. 8B are a schematic diagram of still another communication method according to an embodiment of this application.
Figure 8B:
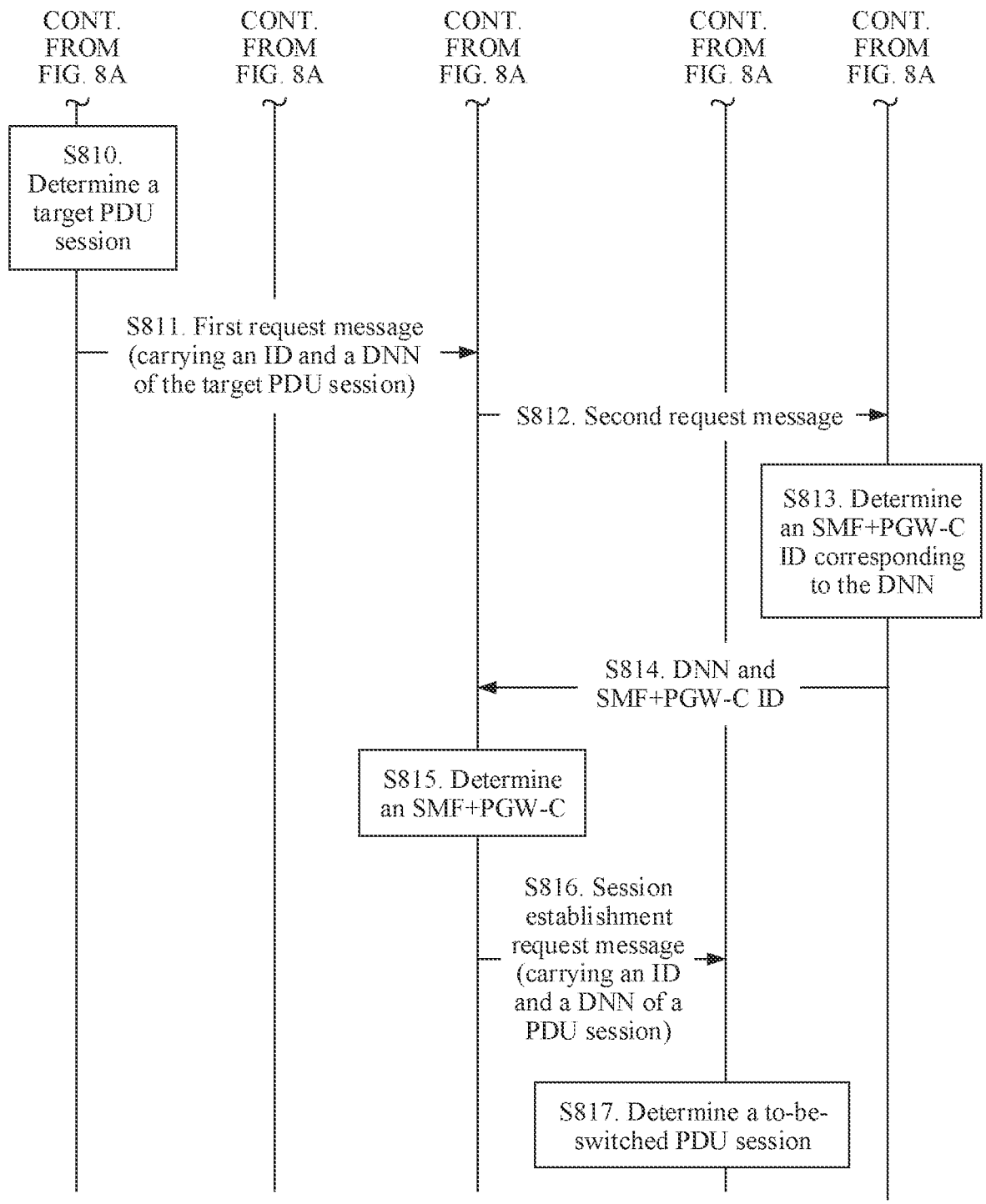

FIG. 8A and FIG. 8B show a communication method 800 according to an embodiment of this application. The method 800 includes the following steps.

S801 is the same as S701.

S802 is the same as S702.

S803. The SMF+PGW-C sends assistance information, an SMF+PGW-C ID, and a DNN of a PDU session to an HSS+UDM, where the assistance information may be the assistance information in the foregoing method.

S804. The HSS+UDM determines switching indication information of the PDU session based on the received assistance information.

S805. The HSS+UDM stores the switching indication information of the PDU session, the SMF+PGW-C ID, and the DNN of the PDU session.

S806. The HSS+UDM sends a response message to the SMF+PGW-C, where the response message carries the switching indication information of the PDU session.

It should be understood that the HSS+UDM herein may receive assistance information of PDU sessions, SMF+PGW-C IDs, DNNs of the PDU sessions that are sent by multiple SMF+PGW-Cs. The HSS+UDM sends, to each SMF+PGW-C, determined switching indication information of a PDU session corresponding to the SMF+PGW-C.

S807 to S817 are the same as S708 to S718.

Figure 9:
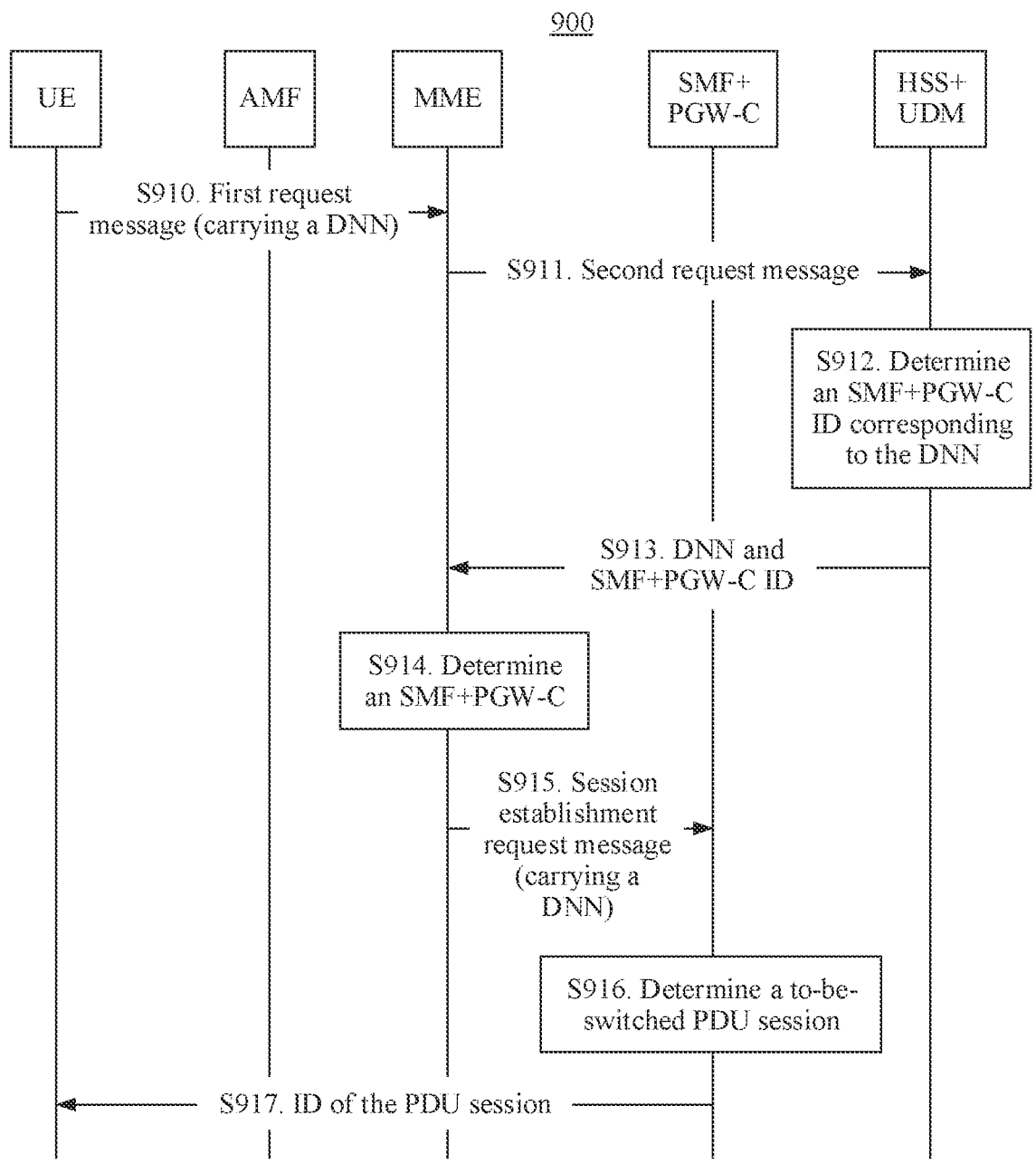
FIG. 9 is a schematic diagram of still another communication method according to an embodiment of this application.

FIG. 9 shows a communication method 900 according to an embodiment of this application. The method 900 includes the following steps.

Steps before S910 in the method 900 may be the same as S701 to S709 in the method 700, or may be the same as S801 to S808 in the method 800. Herein, only steps after S910 in the method 900 are described.

S910. When the UE moves to a 4G network, the UE sends a first request message to an MME, where the first request message carries a DNN of a current PDU session, and the first request message may be an attach request message or a session establishment request message.

S911 is the same as S812.
S912 is the same as S813.
S913 is the same as S814.
S914 is the same as S815.

S915. The MME sends a session establishment request message to the SMF+PGW-C, where the session establishment request message carries the DNN of the current PDU session.

S916. If there is only one PDU session corresponding to the DNN and belonging to the SMF+PGW-C, the SMF+PGW-C determines the PDU session as a to-be-switched PDU session; or if there are multiple PDU sessions corresponding to the DNN and belonging to the SMF+PGW-C, the SMF+PGW-C may determine one PDU session from the multiple PDU sessions as a to-be-switched PDU session.

S917. The SMF+PGW-C sends an identifier of the to-be-switched PDU session to the UE, so that the UE associates the PDU session with a PDN connection based on the identifier of the PDU session. Optionally, the identifier of the PDU session is sent to the UE by using a PCO.

FIG. 6A to FIG. 9 show communication methods used when no N26 interface is deployed between the MME and the AMF. The following describes, with reference to FIG. 10A to FIG. 13, communication methods used when an N26 interface is deployed between the MME and the AMF.

Figure 10A:
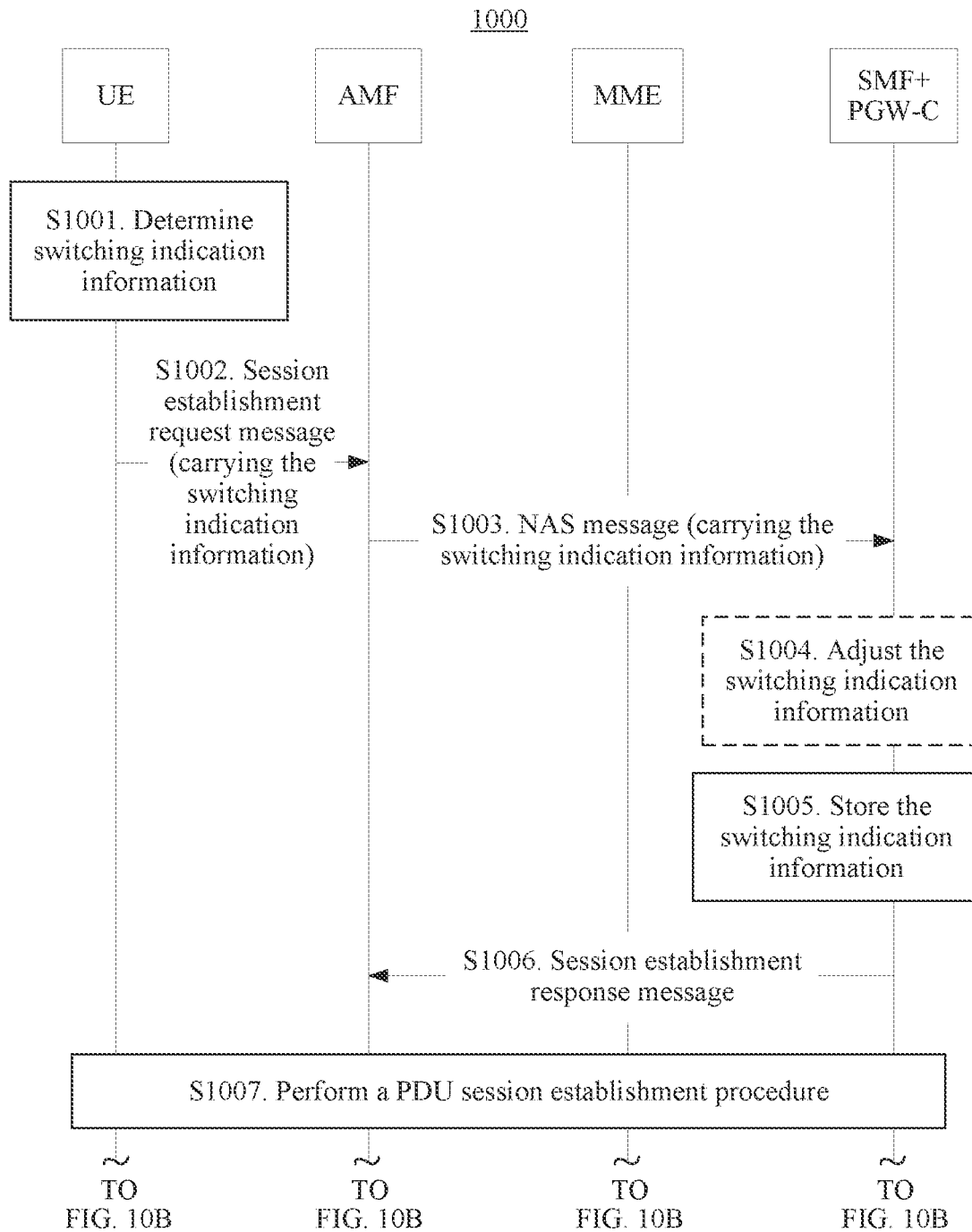
FIG. 10A and FIG. 10B are a schematic diagram of still another communication method according to an embodiment of this application.
Figure 10B:
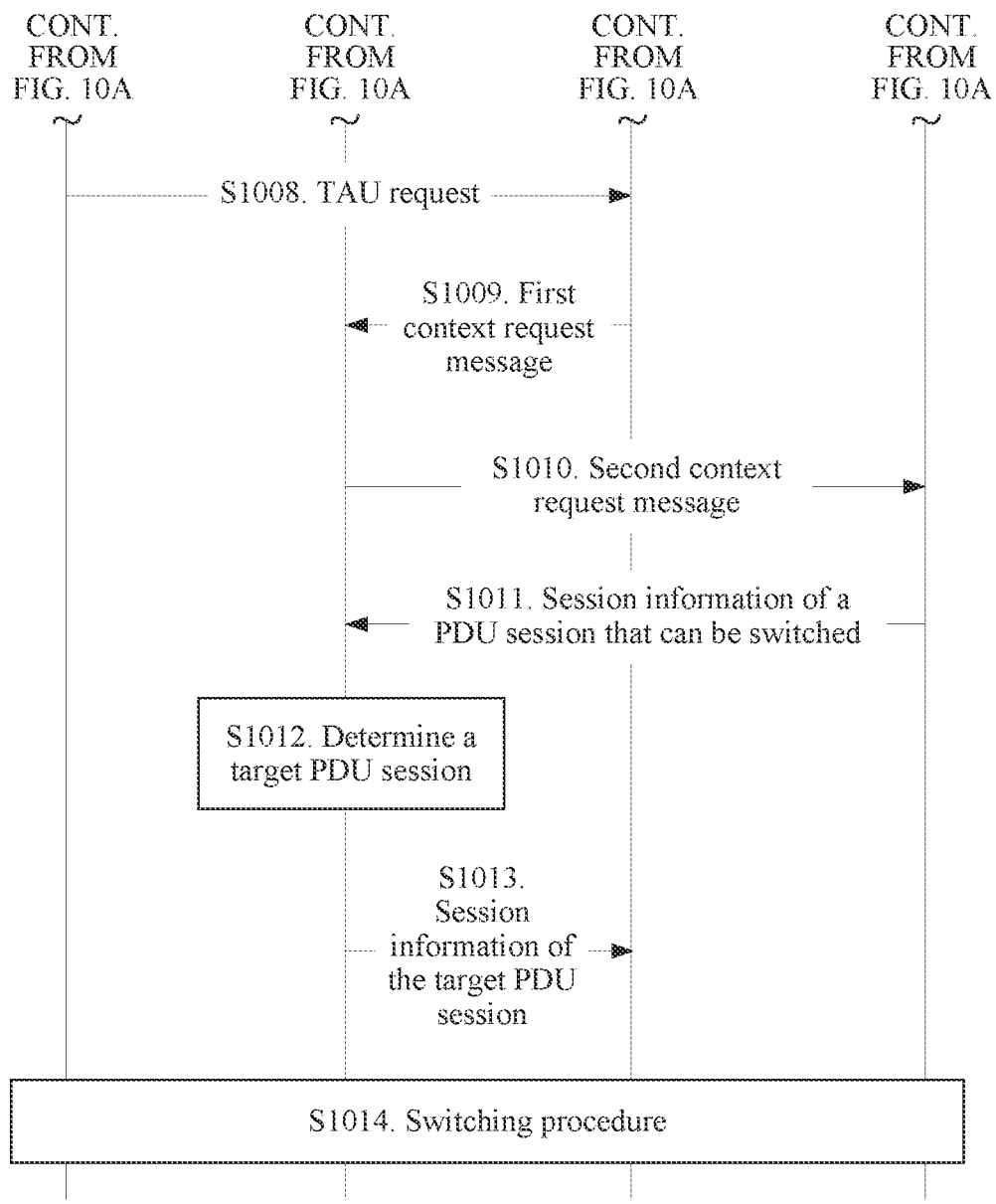

FIG. 10A and FIG. 10B show a communication method 1000 according to an embodiment of this application. The method 1000 includes the following steps.

S1001 is the same as S601.
S1002 is the same as S602.
S1003 is the same as S603.
S1004 is the same as S604.

S1005. The SMF+PGW-C stores the switching indication information of the PDU session.

S1006. The SMF+PGW-C sends a session establishment response message to the AMF.

S1007 is the same as S609.

S1008. When the UE is in an idle state, and the UE moves to a 4G network, the UE may send a tracking area update (TAU) request message to an MME.

S1009. After receiving the TAU request message, the MME sends a first context request message to the AMF, to request the AMF to send context information of the UE to the MME, where the context information of the UE includes a session context.

S1010. After receiving the first context request message sent by the MME, the AMF sends a second context request message to the SMF+PGW—C based on the first context request message, to request a session context from the SMF+PGW-C.

S1011. The SMF+PGW-C sends, to the AMF, session information of a PDU session that can be switched to 4G. For example, the session information includes information such as switching indication information of the PDU session, a default bearer identifier of a PDN connection corresponding to the PDU session, and a DNN and an SMF+PGW-C ID of the PDU session.

S1012. The AMF may receive session information that is of a PDU session and that is sent by each of multiple SMF+PGW-Cs, and the AMF may determine, from PDU sessions with a same DNN, a target PDU session as a to-be-switched PDU session based on the session information.

S1013. The AMF sends session information of the target PDU session to the MME.

S1014. The MME, the AMF, the UE, and the like perform a subsequent switching procedure. This step belongs to the prior art, and is not detailed in this embodiment of this application.

Figure 11A:
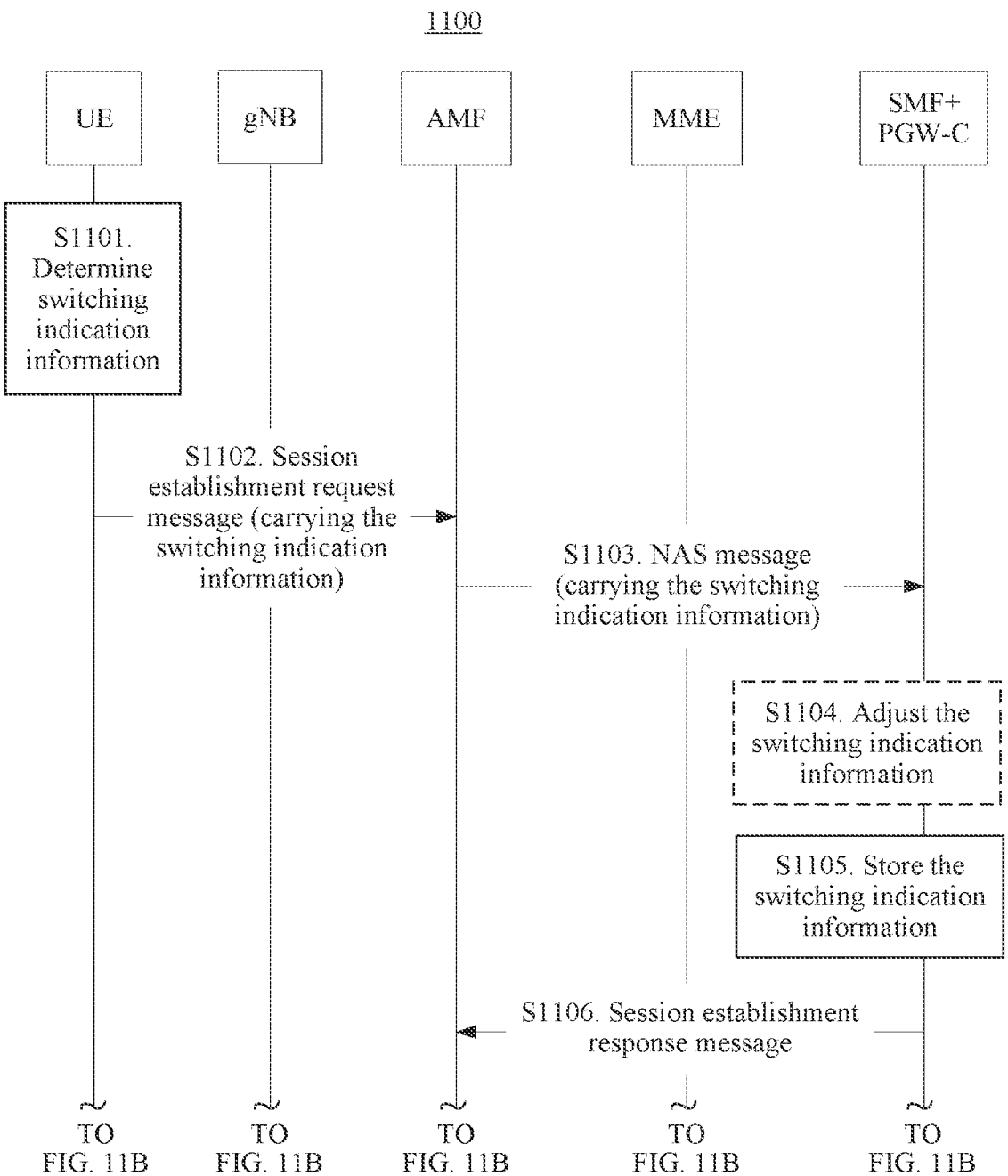
FIG. 11A and FIG. 11B are a schematic diagram of still another communication method according to an embodiment of this application.
Figure 11B:
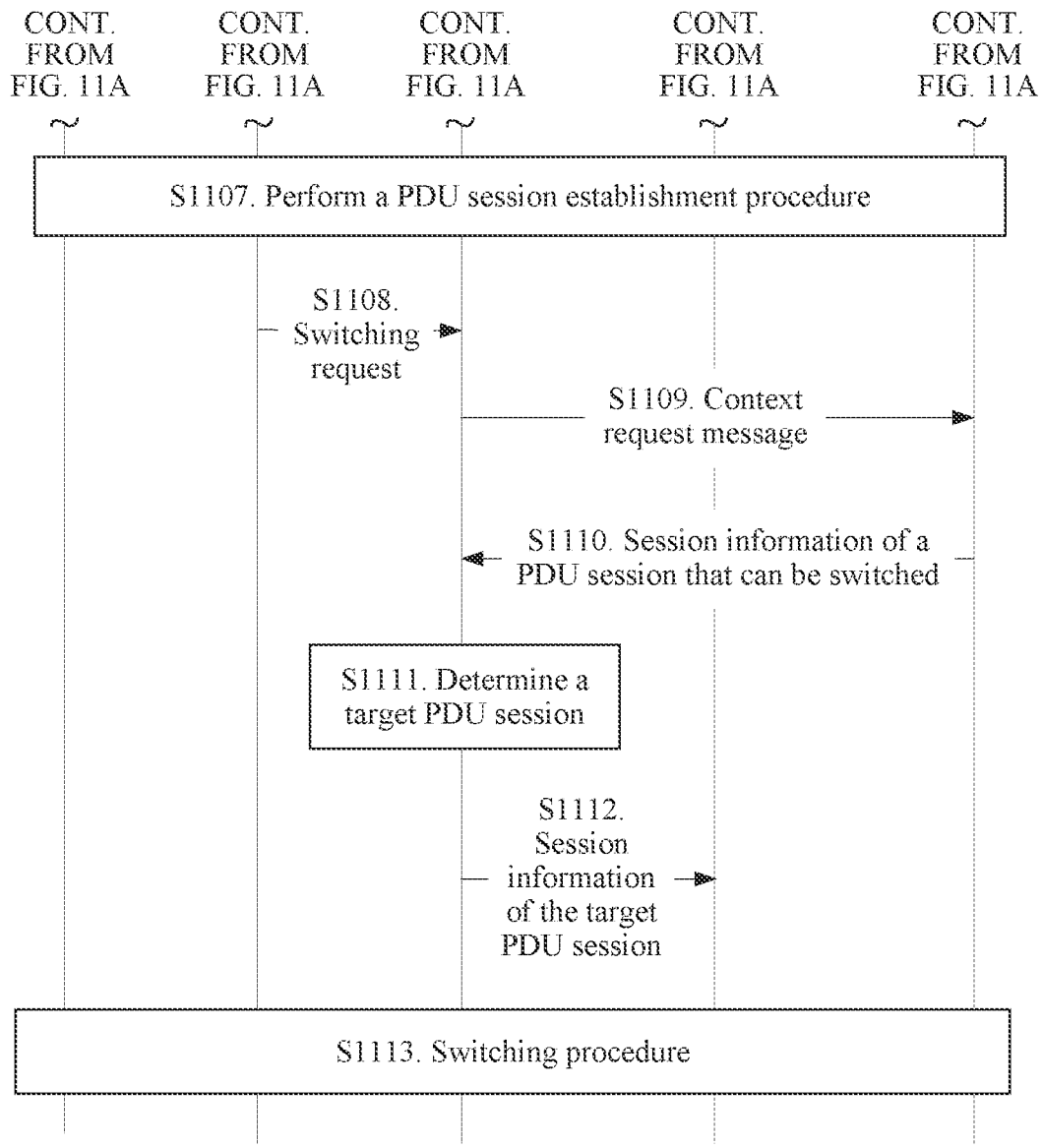

FIG. 11A and FIG. 11B show a communication method 1100 according to an embodiment of this application. The method 1100 includes the following steps.

S1101 to S1107 are the same as S1001 to S1007.

S1108. When the UE is in a data connected state, and a gNB finds that a location of the UE changes, the gNB sends a switching request to the AMF to request that a current PDU session needs to be switched.

S1109. The AMF sends a context request message to the SMF+PGW-C, to obtain a context of the UE.

S1110 is the same as S1011.
S1111 is the same as S1012.
S1112 is the same as S1013.
S1113 is the same as S1014.

Figure 12:
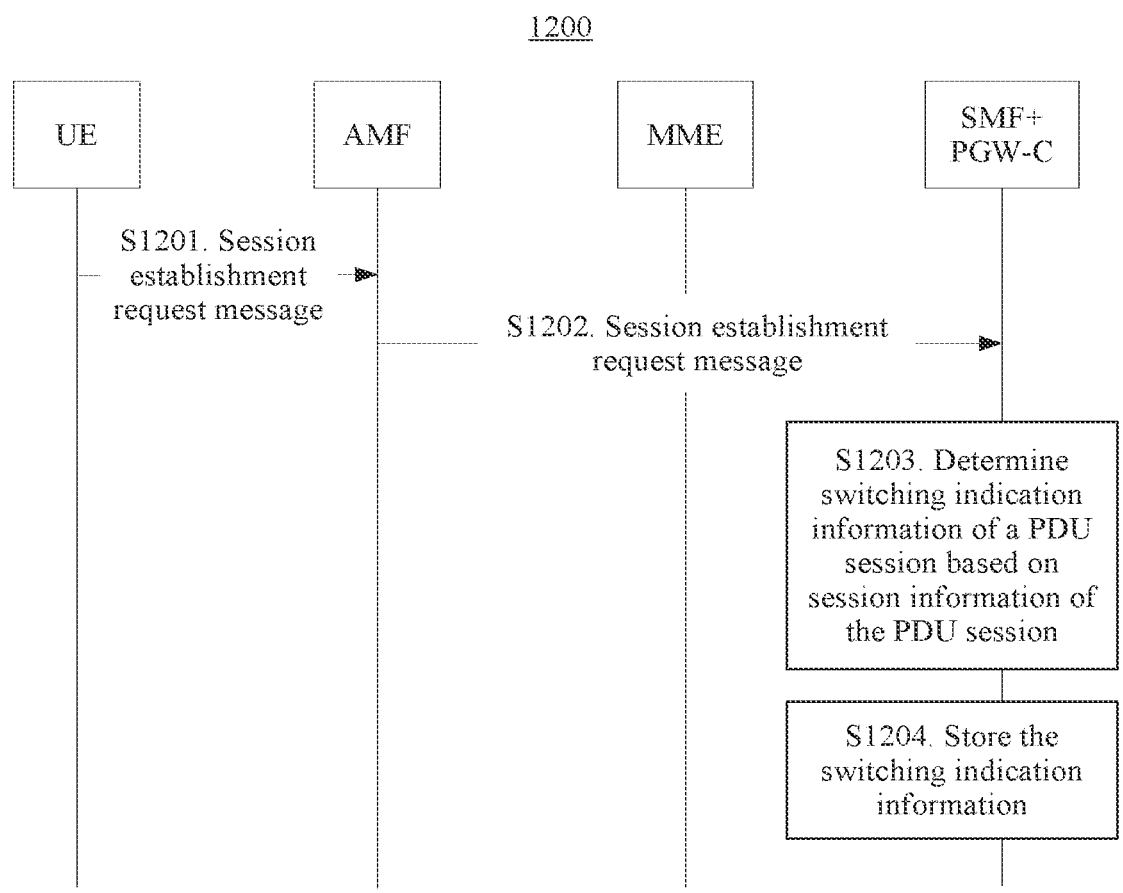
FIG. 12 is a schematic diagram of still another communication method according to an embodiment of this application.

FIG. 12 shows a communication method 1200 according to an embodiment of this application. The method 1200 includes the following steps.

Steps after S1204 in the method 1200 may be the same as S1008 to S1014 in the method 1000, or may be the same as S1106 to S1113 in the method 1100. Herein, only steps before Sl204 in the method 1200 are described.

S1201 is the same as S801.
S1202 is the same as S802.

S1203. The SMF+PGW-C determines switching indication information of a PDU session based on assistance information of the PDU session. For example, the assistance information may be the foregoing assistance information.

S1204 is the same as S1105.

Figure 13:
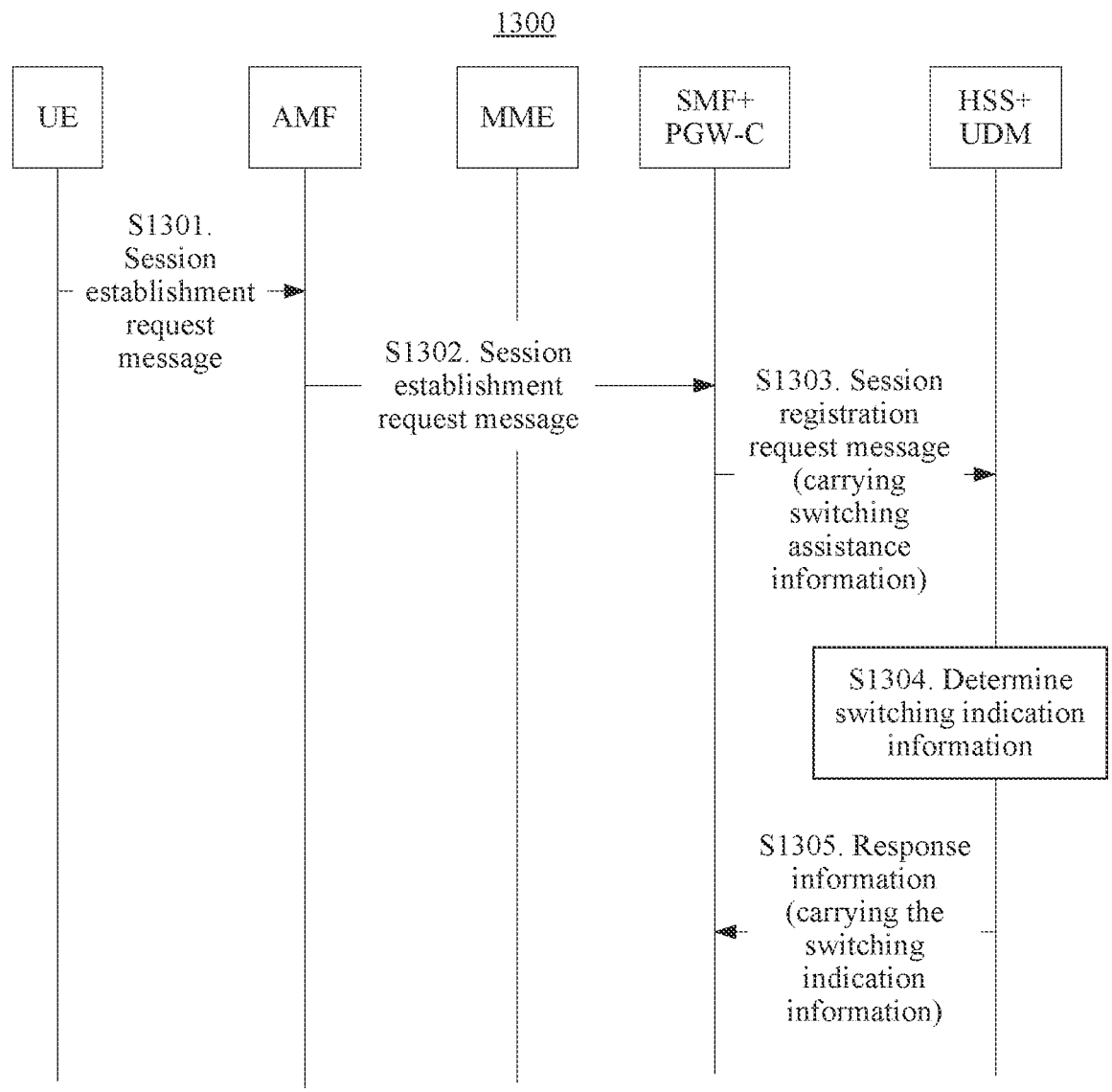
FIG. 13 is a schematic diagram of still another communication method according to an embodiment of this application.

FIG. 13 shows a communication method 1300 according to an embodiment of this application. The method 1300 includes the following steps.

Steps after S1305 in the method 1300 may be the same as S1006 to S1014 in the method 1000, or may be the same as S1106 to S1113 in the method 1100. Herein, only steps before S1305 in the method 1300 are described.

S1301 is the same as S801.

S1302 is the same as S802.

S1303. The SMF+PGW-C sends a session registration request message to an HSS+UDM, where the session registration request message includes assistance information, and the assistance information may be the foregoing assistance information.

S1304. The HSS+UDM receives the session registration request message sent by the SMF+PGW-C, obtains the assistance information from the session registration request message, and determines switching indication information of a PDU session based on the assistance information. In this way, the HSS+UDM can determine switching indication information of PDU sessions corresponding to multiple SMF+PGW-Cs.

S1305. The HSS+UDM sends, to each SMF+PGW-C by using a response message of the session registration request message, switching indication information of a PDU session corresponding to the SMF+PGW-C.

It should be understood that sequences of steps in the method 200 to the method 1300 are not limited in the embodiments of this application, and sequence numbers of steps in each method do not indicate a sequence. In actual application, the sequence of the steps in each method can be adjusted. For example, the sequence of the steps in each method may be determined based on internal logic.

The foregoing details the communication methods in the embodiments of this application with reference to FIG. 1 to FIG. 13. The following details communications apparatuses in the embodiments of this application with reference to FIG. 14 to FIG. 19.

Figure 14:
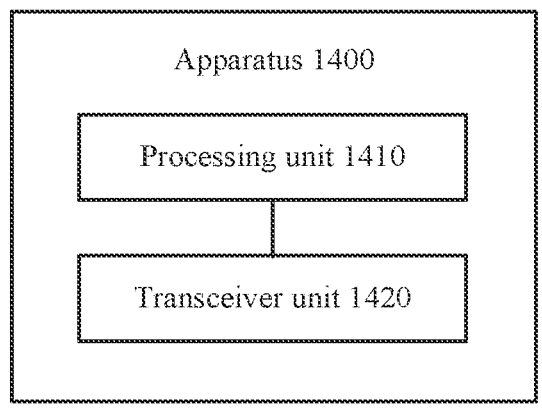
FIG. 14 is a schematic block diagram of a communications apparatus according to an embodiment of this application.

FIG. 14 shows a communications apparatus 1400 according to an embodiment of this application. The apparatus 1400 may be the foregoing network device. The network device may be a user data management network element or an access and mobility management function device. The apparatus 1400 includes:

a processing unit 1410, configured to determine, based on switching indication information of protocol data unit PDU sessions established by a terminal in a first network, a target PDU session from the established PDU sessions, where all the established PDU sessions have a same data network name DNN; and a transceiver unit 1420, configured to send session information of the target PDU session to a mobility management entity device in a second network.

In an optional embodiment, the switching indication information is used to indicate a switching priority of each of the established PDU sessions. The processing unit 1410 is specifically configured to determine, as the target PDU session, a PDU session with a highest switching priority in the established PDU sessions.

In an optional embodiment, the switching indication information is used to indicate whether each of the established PDU sessions can be switched. The processing unit 1410 is specifically configured to: when the switching indication information indicates that there is only one PDU session that can be switched, determine the PDU session that can be switched as the target PDU session; or when the switching indication information indicates that there are at least two PDU sessions that can be switched, determine the target PDU session from the at least two PDU sessions.

In an optional embodiment, the processing unit 1410 is specifically configured to: if the at least two PDU sessions belong to a same control plane function network element, determine each of the at least two sessions as the target PDU session; or if the at least two PDU sessions belong to different control plane function network elements, determine the target PDU session from the at least two PDU sessions based on assistance information of each of the at least two PDU sessions.

In an optional embodiment, the apparatus 1400 is a user data management network element. The transceiver unit 1420 is further configured to: before the target PDU session is determined from the established PDU sessions based on the switching indication information of the protocol data unit PDU sessions established by the terminal in the first network, receive assistance information that is of a first PDU session in the established PDU sessions and that is sent by a first control plane function network element.

The processing unit 1410 is further configured to determine switching indication information of the first PDU session based on the assistance information.

In an optional embodiment, the assistance information includes at least one of the following: an internet protocol IP address version corresponding to the PDU session, single network slice selection assistance information corresponding to the PDU session, a session and service continuity SSC mode corresponding to the PDU session, an allocation and retention priority ARP corresponding to the PDU session, a service type corresponding to the PDU session, and an establishment time corresponding to the PDU session.

In an optional embodiment, the transceiver unit 1420 is further configured to: before the target PDU session is determined from the established PDU sessions based on the switching indication information of the protocol data unit PDU sessions established by the terminal in the first network, receive the switching indication information that is of the PDU sessions established by the terminal in the first network and that is sent by at least one control plane function network element.

In an optional embodiment, the apparatus 1400 is a user data management network element. The transceiver unit 1420 is further configured to: before the target PDU session is determined from the established PDU sessions based on the switching indication information of the protocol data unit PDU sessions established by the terminal in the first network, receive initial switching indication information that is of a second PDU session in the PDU sessions established by the terminal in the first network and that is sent by a second control plane function network element. The processing unit 1410 is further configured to adjust the initial switching indication information to obtain switching indication information of the second PDU session. The transceiver unit 1420 is further configured to send the switching indication information of the second PDU session to the second control plane function network element.

In an optional embodiment, the session information of the target PDU session includes an identifier of a control plane function network element corresponding to the target PDU session and a DNN of the target PDU session.

It should be understood that the apparatus 1400 herein is presented in a form of a function unit. The term "unit" herein may be an application specific integrated circuit (ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 1400 may be specifically the network device in the foregoing method embodiment, and the apparatus 1400 may be configured to perform procedures and/or steps corresponding to the network device in the foregoing method embodiment. To avoid repetition, details are not described herein again.

Figure 15:
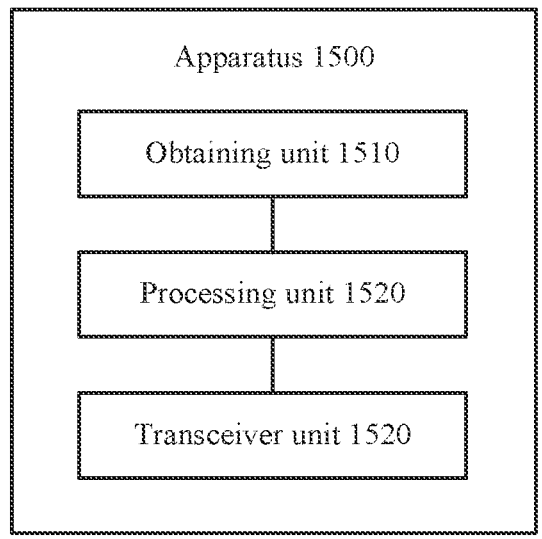
FIG. 15 is a schematic block diagram of another communications apparatus according to an embodiment of this application.

FIG. 15 shows a communications apparatus 1500 according to an embodiment of this application. The apparatus 1500 may be the foregoing terminal. The apparatus 1500 includes:

an obtaining unit 1510, configured to obtain switching indication information of protocol data unit PDU sessions established in a first network, where all the established PDU sessions have a same data network name DNN;

a processing unit 1520, configured to determine a target PDU session from the established PDU sessions based on the switching indication information of the established PDU sessions; and a transceiver unit 1530, configured to send an identifier of the target PDU session to a first control plane function network element by using a mobility management entity device in a second network.

In an optional embodiment, the switching indication information is used to indicate a switching priority of each of the established PDU sessions. The processing unit 1520 is specifically configured to determine, as the target PDU session, a PDU session with a highest switching priority in the established PDU sessions.

In an optional embodiment, the switching indication information is used to indicate whether each of the established PDU sessions can be switched. The processing unit 1520 is specifically configured to determine, as the target PDU session, a PDU session that can be switched in the established PDU sessions.

In an optional embodiment, the transceiver unit 1530 is specifically configured to send the identifier of the target PDU session and a DNN of the target PDU session to the mobility management entity device, where the DNN of the target PDU session is used by the mobility management entity device to determine the first control plane function network element, so that the mobility management entity device sends the identifier of the target PDU session to the first control plane function network element.

In an optional embodiment, the transceiver unit 1530 is specifically configured to send a first request message to the mobility management entity device, where the first request message carries the identifier of the target PDU session and the DNN of the target PDU session, and the first request message is an attach request message or a session establishment request message.

In an optional embodiment, the obtaining unit 1510 is specifically configured to receive the switching indication information of the established PDU sessions that is sent by at least one control plane function network element.

In an optional embodiment, the transceiver unit 1530 is further configured to: send initial switching indication information of the first PDU session to a second control plane function network element, where the initial switching indication information is used to determine switching indication information of the first PDU session; and receive the switching indication information that is of the first PDU session and that is sent by the second control plane function network element.

It should be understood that the apparatus 1500 herein is presented in a form of a function unit. The term "unit" herein may be an application-specific integrated circuit (ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 1500 may be specifically the terminal in the foregoing method embodiment, and the apparatus 1500 may be configured to perform procedures and/or steps corresponding to the terminal in the foregoing method embodiment. To avoid repetition, details are not described herein again.

Figure 16:
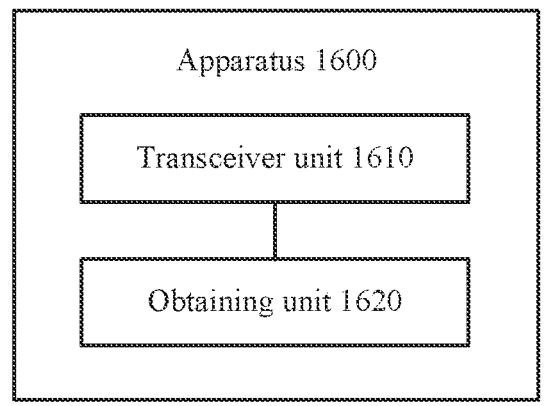
FIG. 16 is a schematic block diagram of still another communications apparatus according to an embodiment of this application.

FIG. 16 shows a communications apparatus 1600 according to an embodiment of this application. The apparatus 1600 may be the foregoing first control plane function network element. The apparatus 1600 includes:

a transceiver unit 1610, configured to receive a session establishment request message sent by a terminal, where the session establishment request message is used to request to establish a first protocol data unit PDU session; and an obtaining unit 1620, configured to obtain switching indication information of the first PDU session.

In an optional embodiment, the switching indication information is used to indicate a priority of the first PDU session or used to indicate whether the first PDU session can be switched.

In an optional embodiment, the session establishment request message includes the switching indication information of the first PDU session. The obtaining unit 1620 is specifically configured to obtain the switching indication information of the first PDU session from the session establishment request message. The transceiver unit 1610 is further configured to send the switching indication information of the first PDU session to a user data management network element or an access and mobility management function device.

In an optional embodiment, the obtaining unit 1620 is specifically configured to obtain initial switching indication information of the first PDU session. The apparatus 1600 further includes a processing unit, configured to obtain the switching indication information that is of the first PDU session and that is obtained through adjustment based on the initial switching indication information. The transceiver unit 1610 is further configured to send the switching indication information of the first PDU session to the terminal, a user data management network element, or an access and mobility management function device.

In an optional embodiment, the transceiver unit 1610 is further configured to: send assistance information of the first PDU session to a user data management network element; receive the switching indication information that is of the first PDU session and that is sent by the user data management network element, where the switching indication information of the first PDU session is determined based on the assistance information of the first PDU session, and the assistance information of the first PDU session includes at least one of an internet protocol IP address version corresponding to the first PDU session, single network slice selection assistance information corresponding to the first PDU session, a session and service continuity SSC mode corresponding to the first PDU session, an allocation and retention priority ARP corresponding to the first PDU session, a service type corresponding to the first PDU session, and an establishment time corresponding to the first PDU session; and send the switching indication information of the first PDU session to the terminal or an access and mobility management function device.

In an optional embodiment, the transceiver unit 1610 is further configured to send a data network name DNN of the first PDU session and an identifier of the apparatus to the user data management network element.

It should be understood that the apparatus 1600 herein is presented in a form of a function unit. The term "unit" herein may be an application-specific integrated circuit (ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 1600 may be specifically the first control plane function network element or the second control plane function network element in the foregoing method embodiment, and the apparatus 1600 may be configured to perform procedures and/or steps corresponding to the first control plane function network element or the second control plane function network element in the foregoing method embodiment. To avoid repetition, details are not described herein again.

The apparatus 1400 is completely corresponding to the network device in the method embodiments, the apparatus 1500 is completely corresponding to the terminal in the method embodiments, and the apparatus 1600 is completely corresponding to the first control plane function network element or the second control plane function network element in the method embodiments. A corresponding unit performs a corresponding step. For example, the transceiver unit performs receiving and sending steps in the method embodiments, and the processing unit may perform steps other than the receiving and sending steps. For a function of a specific unit, refer to a corresponding method embodiment. Details are not described again.

The apparatus 1400 to the apparatus 1600 in the foregoing solutions have functions of implementing corresponding steps performed by the network device, the terminal, the first control plane function network element, or the second control plane function network element in the foregoing methods, and the functions may be implemented by using hardware, or may be implemented by hardware executing corresponding software. The hardware or software includes one or more modules corresponding to the foregoing functions. For example, a sending unit may be replaced with a transmitter, a receiving unit may be replaced with a receiver, and another unit such as a determining unit may be replaced with a processor, to separately perform a sending operation, a receiving operation, and a related processing operation in the method embodiments.

In the embodiments of this application, the apparatuses in FIG. 14 to FIG. 16 each may be a chip or a chip system, for example, a system on chip (SoC). Correspondingly, the receiving unit and the sending unit may be a transceiver circuit of the chip. This is not limited herein.

Figure 17:
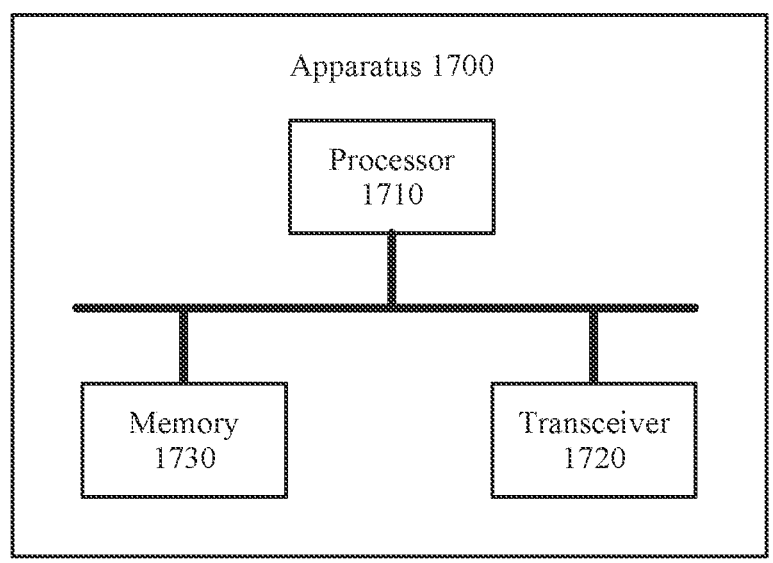
FIG. 17 is a schematic block diagram of still another communications apparatus according to an embodiment of this application.

FIG. 17 shows still another communications apparatus 1700 according to an embodiment of this application. The apparatus 1700 includes a processor 1710, a transceiver 1720, and a memory 1730. The processor 1710, the transceiver 1720, and the memory 1730 communicate with each other through an internal connection path. The memory 1730 is configured to store an instruction. The processor 1710 is configured to execute the instruction stored in the memory 1730, to control the transceiver 1720 to send a signal and/or receive a signal.

The processor 1710 is configured to determine, based on switching indication information of protocol data unit PDU sessions established by a terminal in a first network, a target PDU session from the established PDU sessions, where all the established PDU sessions have a same data network name DNN. The transceiver 1720 is configured to send session information of the target PDU session to a mobility management entity device in a second network.

It should be understood that the apparatus 1700 may be specifically the network device in the foregoing method embodiment, and may be configured to perform steps and/or procedures corresponding to the network device in the foregoing method embodiment. Optionally, the memory 1730 may include a read-only memory and a random access memory, and provide an instruction and data for the processor. A part of the memory may further include a nonvolatile random access memory. For example, the memory may further store device type information. The processor 1710 may be configured to execute the instruction stored in the memory. In addition, when the processor 1710 executes the instruction stored in the memory, the processor 1710 is configured to perform the steps and/or procedures corresponding to the network device in the foregoing method embodiment.

Figure 18:
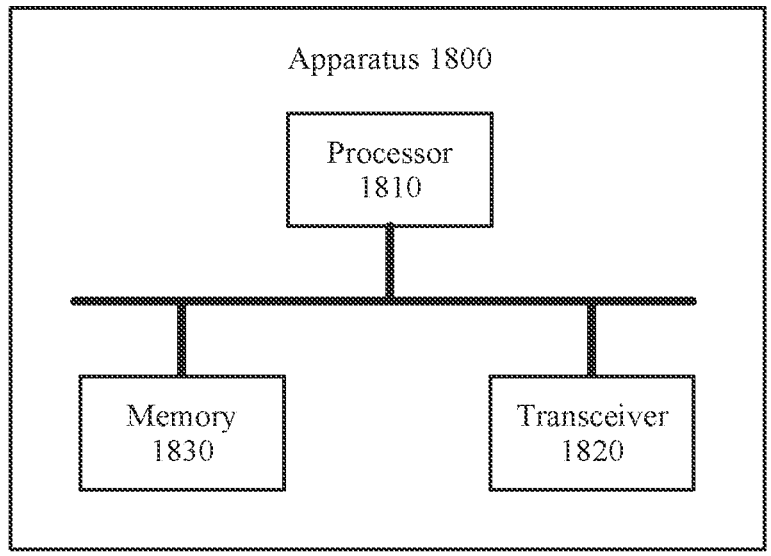
FIG. 18 is a schematic block diagram of still another communications apparatus according to an embodiment of this application.

FIG. 18 shows still another communications apparatus 1800 according to an embodiment of this application. The apparatus 1800 includes a processor 1810, a transceiver 1820, and a memory 1830. The processor 1810, the transceiver 1820, and the memory 1830 communicate with each other through an internal connection path. The memory 1830 is configured to store an instruction. The processor 1810 is configured to execute the instruction stored in the memory 1830, to control the transceiver 1820 to send a signal and/or receive a signal.

The transceiver 1820 is configured to obtain switching indication information of protocol data unit PDU sessions established in a first network, where all the established PDU sessions have a same data network name DNN. The processor 1810 is configured to determine a target PDU session from the established PDU sessions based on the switching indication information of the established PDU sessions. The transceiver 1820 is configured to send an identifier of the target PDU session to a first control plane function network element by using a mobility management entity device in a second network.

It should be understood that the apparatus 1800 may be specifically the terminal in the foregoing method embodiment, and may be configured to perform steps and/or procedures corresponding to the terminal in the foregoing method embodiment. Optionally, the memory 1830 may include a read-only memory and a random access memory, and provide an instruction and data for the processor. A part of the memory may further include a nonvolatile random access memory. For example, the memory may further store device type information. The processor 1810 may be configured to execute the instruction stored in the memory. In addition, when the processor 1810 executes the instruction stored in the memory, the processor 1810 is configured to perform the steps and/or procedures corresponding to the terminal in the foregoing method embodiment.

Figure 19:
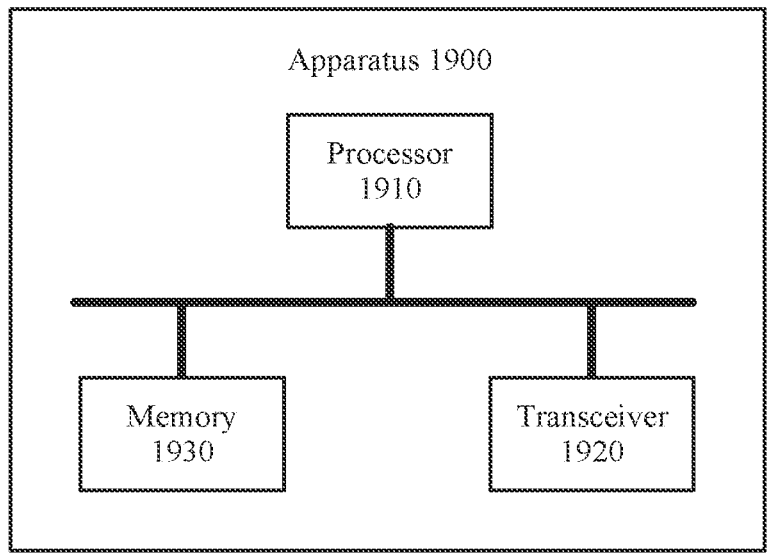
FIG. 19 is a schematic block diagram of still another communications apparatus according to an embodiment of this application.

FIG. 19 shows still another communications apparatus 1900 according to an embodiment of this application. The apparatus 1900 includes a processor 1910, a transceiver 1920, and a memory 1930. The processor 1910, the transceiver 1920, and the memory 1930 communicate with each other through an internal connection path. The memory 1930 is configured to store an instruction. The processor 1910 is configured to execute the instruction stored in the memory 1930, to control the transceiver 1920 to send a signal and/or receive a signal.

The transceiver 1920 is configured to receive a session establishment request message sent by a terminal, where the session establishment request message is used to request to establish a first protocol data unit PDU session. The transceiver 1920 is further configured to obtain switching indication information of the first PDU session.

It should be understood that the apparatus 1900 may be specifically the first control plane function network element or the second control plane function network element in the foregoing method embodiment, and may be configured to perform steps and/or procedures corresponding to the first control plane function network element or the second control plane function network element in the foregoing method embodiment. Optionally, the memory 1930 may include a read-only memory and a random access memory, and provide an instruction and data for the processor. A part of the memory may further include a nonvolatile random access memory. For example, the memory may further store device type information. The processor 1910 may be configured to execute the instruction stored in the memory. In addition, when the processor 1910 executes the instruction stored in the memory, the processor 1910 is configured to perform the steps and/or procedures corresponding to the core network element in the first network in the foregoing method embodiment.

It should be understood that the transceiver may include a transmitter and a receiver. The transceiver may further include an antenna, where there may be one or more antennas. The memory may be an independent device, or may be integrated into the processor. All or some of the foregoing components may be integrated into a chip for implementation, for example, integrated into a baseband chip for implementation.

In the embodiments of this application, alternatively, the transceivers in FIG. 17 to FIG. 19 each may be a communications interface. This is not limited herein.

In the embodiments of this application, the first control plane function network element or the second control plane function network element may be a physical entity device, or may be a virtual function network element. This is not limited herein.

In the embodiments of this application, for ease of understanding, multiple examples are used for description. However, these examples are merely examples, and this does not mean that the examples are best implementations for implementing this application.

In the embodiments of this application, for ease of description, the request message, the response message, and various other message names are used. However, these messages are merely used as examples to describe content that needs to be carried or a function that needs to be implemented. A specific name of the message is not limited in this application. For example, the message may be a first message, a second message, or a third message. These messages may be some specific messages, or may be some fields in a message. These messages may also represent various service operations.

It should also be understood that, the processor in the foregoing apparatus in the embodiments of this application may be a central processing unit (CPU), or the processor may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor or the like.

In an implementation process, steps in the foregoing methods can be completed by using a hardware integrated logical circuit in the processor, or by using instructions in a form of software. The steps in the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, a register, or the like. The storage medium is located in the memory, and the processor executes instructions in the memory and completes the steps in the foregoing methods in combination with the hardware in the processor. To avoid repetition, details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedure or functions according to the embodiments of this application are all or partially generated. The computer may be a general purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, multiple units or components may be combined or integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on multiple network units. Some or all of the units may be selected depending on actual requirements to achieve the objectives of the solutions of the embodiments.

In addition, function units in the embodiments of this application may be integrated into one processing unit, each of the units may exist alone physically, or at least two units are integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps in the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
receiving, by a control plane function network element, a first session establishment request message from a terminal when the terminal is in a first network, wherein the first session establishment request message requests to establish a protocol data unit (PDU) session with a data network name (DNN) in the first network;
determining, by control plane function network element, a switching indication information of the PDU session, wherein the switching indication information indicates that the PDU session is switchable to a second network;
sending, by the control plane function network element, the switching indication information of the PDU session to a network device;
receiving, by a mobility management entity device, a first request message from the terminal, wherein the mobility management entity device belongs to the second network;
in response to the first request message, sending, by the mobility management entity device, a second request message to the network device; and
sending, by the network device according to the switching indication information of the PDU session, session information of the PDU session to the mobility management entity device, wherein the session information comprises an identifier of the control plane function network element.

2. The communication method of claim 1, further comprising:
sending, by the mobility management entity device based on the identifier of the control plane function network element, a second session establishment request message to the control plane function network element for transferring the PDU session to the second network.

3. The communication method of claim 1, wherein the determining the switching indication information comprises:
obtaining, by the control plane function network element, initial switching indication information of the PDU session; and
determining, by the control plane function network element, the switching indication information of the PDU session based on the initial switching indication information.

4. The communication method of claim 1, wherein the sending, by the network device according to the switching indication information of the PDU session, session information of the PDU session to the mobility management entity device comprises:
determining, by the network device based on switching indication information of the PDU session, the PDU session from established PDU sessions of the terminal, wherein the established PDU sessions have the same DNN; and
sending, by the network device, the session information of the PDU session to the mobility management entity device.

5. The communication method of claim 1, wherein the network device is a user data management network element.

6. The communication method of claim 1, wherein the switching indication information of the PDU session is included in session information when sent to the network device, and the session information further comprises the DNN.

7. The communication method of claim 1, wherein the first network is a 5G network, and the second network is a 4G network.

8. A communication system, comprising:
a control plane function network element, configured to:
receive a first session establishment request message from a terminal when the terminal is in a first network, wherein the first session establishment request message requests to establish a protocol data unit (PDU) session with a data network name (DNN) in the first network;
determine a switching indication information of the PDU session, wherein the switching indication information indicates that the PDU session is switchable to a second network; and
send the switching indication information of the PDU session to a network device;
a mobility management entity device, configured to:
receive a first request message from the terminal, wherein the mobility management entity device belongs to the second network; and
in response to the first request message, send a second request message to the network device; and
the network device, configured to:
send, according to the switching indication information of the PDU session, session information of the PDU session to the mobility management entity device, wherein the session information comprises an identifier of the control plane function network element.

9. The communication system of claim 8, wherein the mobility management entity device, further configured to:
send, based on the identifier of the control plane function network element, a second session establishment request message to the control plane function network element for transferring the PDU session to the second network.

10. The communication system of claim 8, wherein control plane function network element, configured to:
obtain initial switching indication information of the PDU session; and
determine the switching indication information of the PDU session based on the initial switching indication information.

11. The communication system of claim 8, wherein the network device, further configured to:
determine, based on switching indication information of the PDU session, the PDU session from established PDU sessions of the terminal, wherein the established PDU sessions have the same DNN.

12. The communication system of claim 8, wherein the first network is a 5G network, and the second network is a 4G network.

13. A communication method, comprising:
receiving a session establishment request message from a terminal, wherein the session establishment request message requests to establish a PDU session with a data network name (DNN) in a first network;
determining a switching indication information of the PDU session, wherein the switching indication information indicates that the PDU session is switchable to a second network; and
sending the switching indication information of the PDU session to a network device.

14. The communication method of claim 13, wherein the determining the switching indication information comprises:
obtaining initial switching indication information of the PDU session; and
determining the switching indication information of the PDU session based on the initial switching indication information.

15. The communication method of claim 13, wherein the network device is a user data management network element.

16. The communication method of claim 1, wherein the first network is a 5G network, and the second network is a 4G network.

17. A communications apparatus, comprising:
at least one processor; and
at least one memory coupled to the at least one processor and having program instructions stored thereon which, when executed by the at least one processor, cause the communications apparatus to:
receive a session establishment request message from a terminal, wherein the session establishment request message requests to establish a PDU session with a data network name (DNN) in a first network;
determine a switching indication information of the PDU session, wherein the switching indication information indicates that the PDU session is switchable to a second network; and
send the switching indication information of the PDU session to a network device.

18. The communications apparatus according to claim 17, wherein the program instructions, when executed by the at least one processor, cause the communications apparatus to:
obtain initial switching indication information of the PDU session; and
determine the switching indication information of the PDU session based on the initial switching indication information.

19. The communications apparatus of claim 17, wherein the network device is a user data management network element.

20. The communications apparatus of claim 17, wherein the first network is a 5G network, and the second network is a 4G network.

* * * * *